United States Patent
Miyazaki et al.

[11] Patent Number: 5,915,137
[45] Date of Patent: *Jun. 22, 1999

[54] FILM FEED DEVICE CAPABLE OF ACCURATELY ALIGNING FILM BY USING ONE PERFORATION SENSOR

[75] Inventors: Satoshi Miyazaki, Hoya; Satoshi Kawakami, Hachioji, both of Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/819,217

[22] Filed: Mar. 17, 1997

[30] Foreign Application Priority Data

Mar. 22, 1996 [JP] Japan .................................. 8-066460

[51] Int. Cl.[6] ..................................................... G03B 1/00
[52] U.S. Cl. ........................... 396/397; 396/406; 396/409; 396/277
[58] Field of Search .................................. 396/277, 280, 396/387, 395, 397, 406, 409

[56] References Cited

U.S. PATENT DOCUMENTS

| | | | |
|---|---|---|---|
| 4,733,265 | 3/1988 | Haraguchi et al. | 396/277 |
| 5,057,859 | 10/1991 | Ishimaru | 396/406 |
| 5,414,482 | 5/1995 | Iwai et al. | 396/407 |
| 5,530,503 | 6/1996 | Takahashi et al. | 396/406 |
| 5,576,785 | 11/1996 | Kazami et al. | 396/397 |
| 5,655,169 | 8/1997 | Newman | 396/395 |

*Primary Examiner*—Eddie C. Lee
*Attorney, Agent, or Firm*—Frishauf, Holtz, Goodman, Langer & Chick

[57] ABSTRACT

In a film feed device using a film having two perforations per frame, a perforation width and a perforation interval which are detected by one perforation sensor during a film feed operation are measured as times by timers in a microcomputer or as film moving amounts by a perforation detection circuit. When the time or the film moving amount measured as this perforation interval is less than the value obtained by multiplying the perforation width by a predetermined value, the film feed operation is stopped by a motor driving circuit and a motor. With this operation, even if the film position deviates from a predetermined position at the start of a film feed operation, the film can be accurately aligned with a correct position by using one perforation sensor.

14 Claims, 23 Drawing Sheets

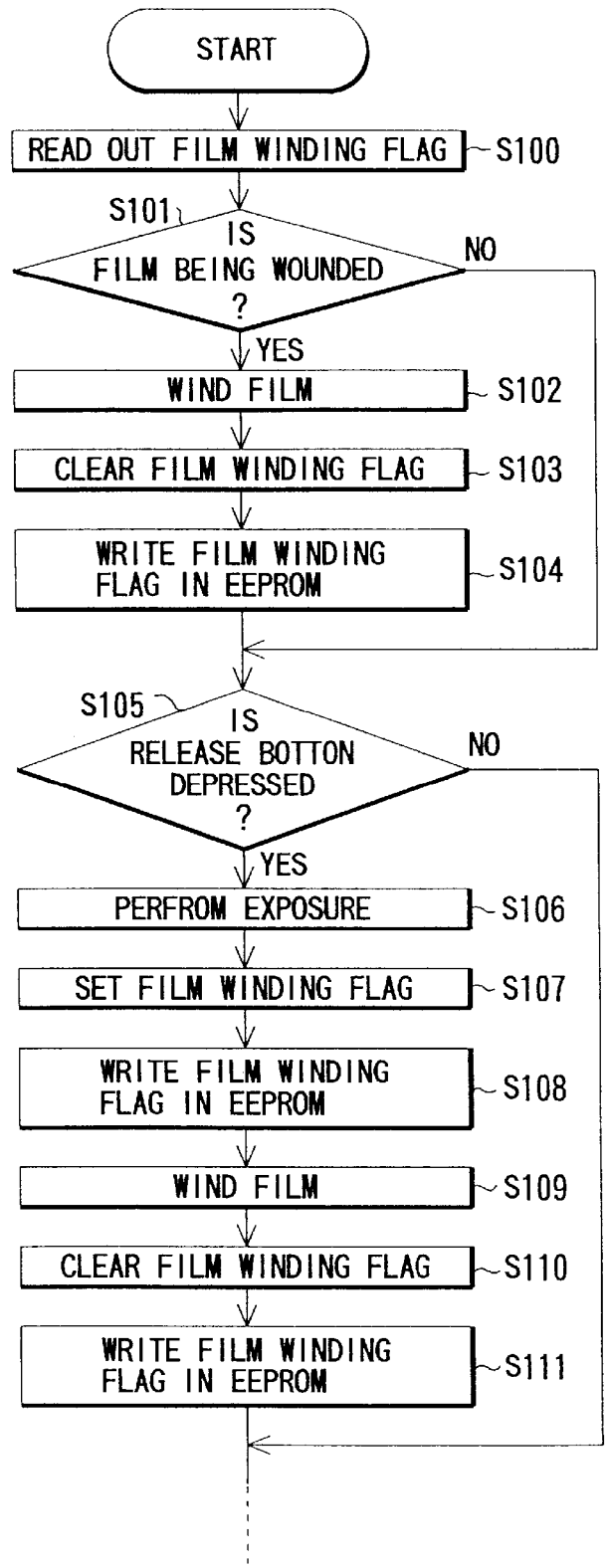
F I G. 3

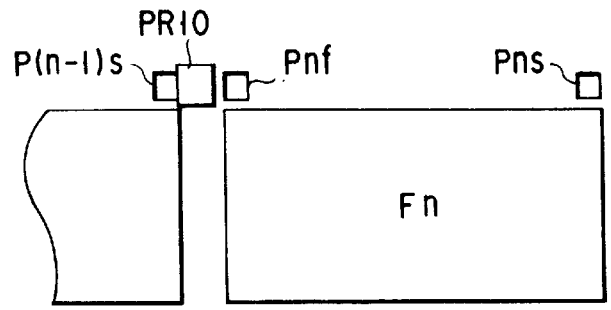
F I G. 7A
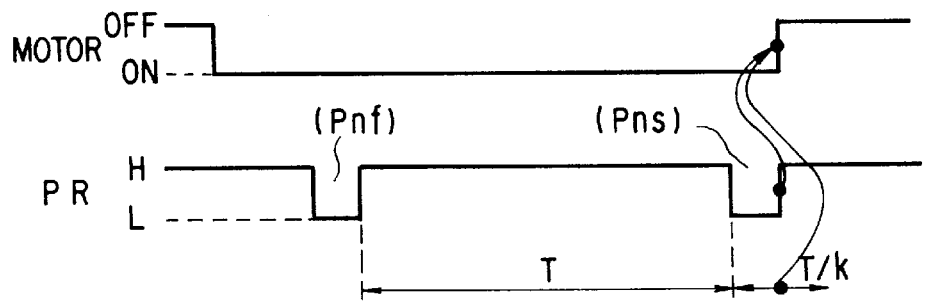
F I G. 7B
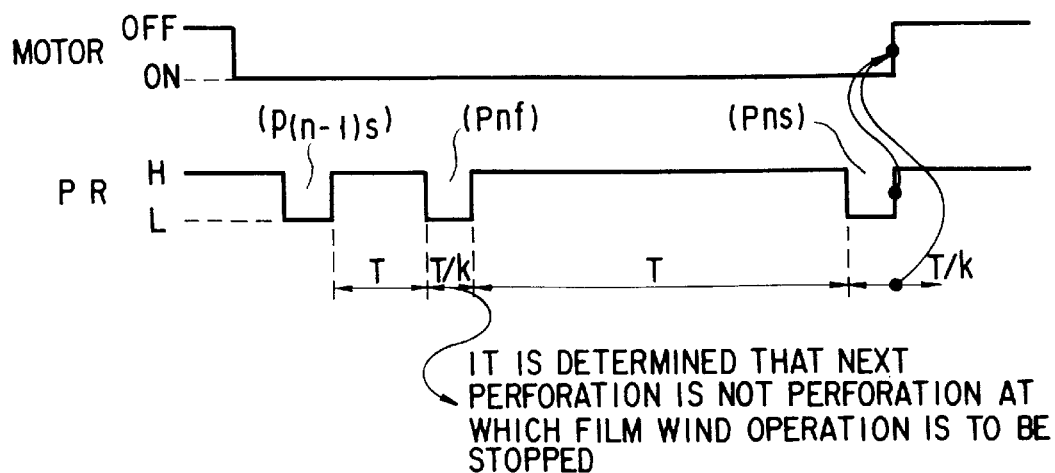
F I G. 7C

IT IS DETERMINED THAT NEXT PERFORATION IS PERFORATION AT WHICH FILM WIND OPERATION IS TO BE STOPPED

WHEN NEXT PERFORATION IS DETECTED DURING TIME kT COUNTING OPERATION, kT TIMER IS STOPPED, AND COUNTING OF TIME T IS STARTED

IT IS DETERMINED THAT NEXT PERFORATION IS PERFORATION AT WHICH FILM WIND OPERATION IS TO BE STOPPED

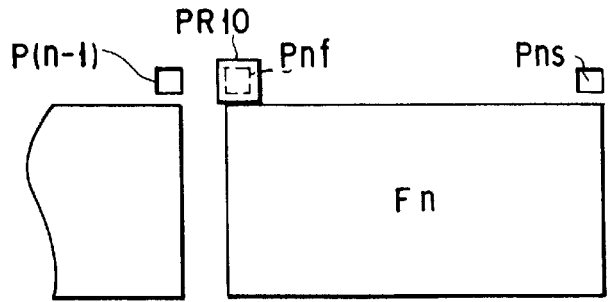
F I G. 23A
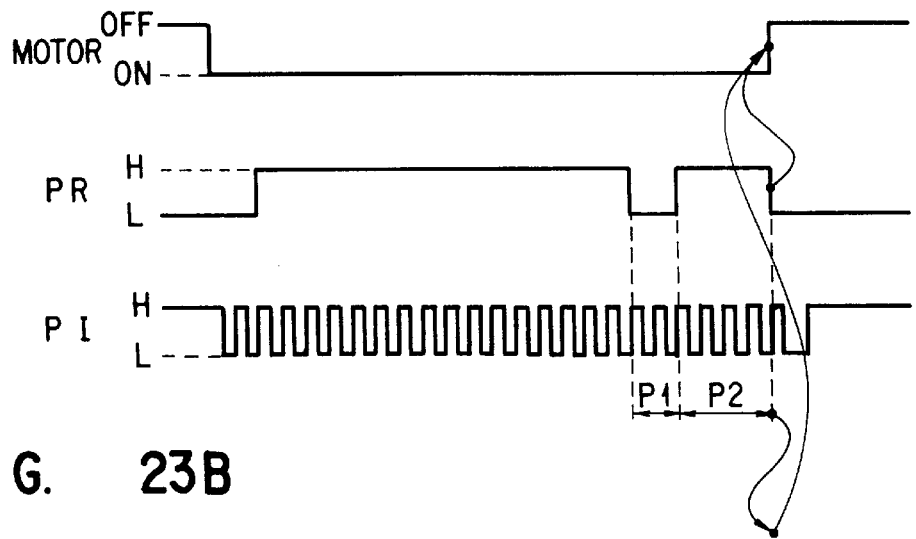
F I G. 23B
FILM WIND OPERATION IS STOPPED BECAUSE P1/P2≧C
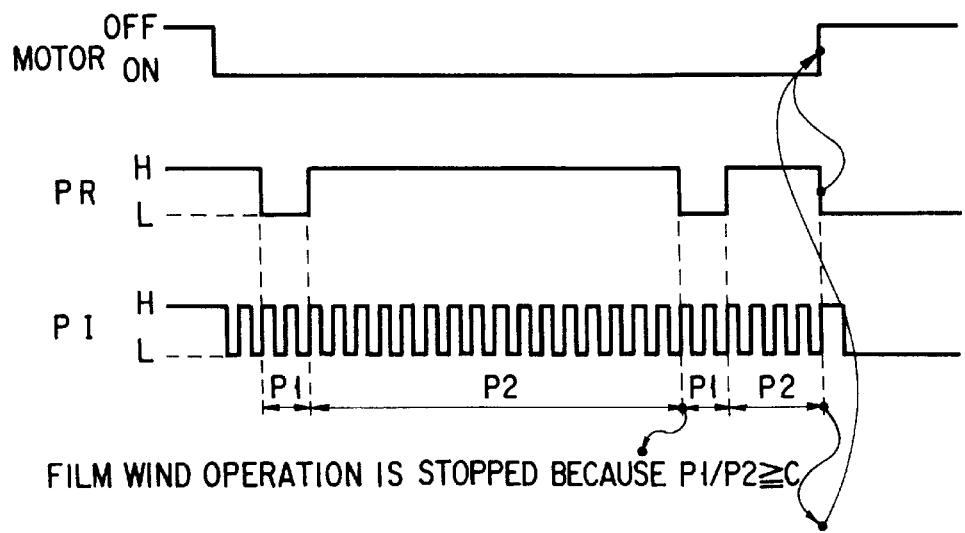
FILM WIND OPERATION IS STOPPED BECAUSE P1/P2≧C
FILM WIND OPERATION IS NOT STOPPED BECAUSE P1/P2<C
F I G. 23C

FILM FEED DEVICE CAPABLE OF ACCURATELY ALIGNING FILM BY USING ONE PERFORATION SENSOR

BACKGROUND OF THE INVENTION

The present invention relates to a film feed device mounted in a camera or the like using a film having two perforations per frame.

Recently, a film having two perforations at predetermined positions per frame and a film feed device for a camera or the like using this film have been proposed.

This film has two perforations formed for the photographing area of each frame at predetermined positions. Film feed control can therefore be performed to accurately align the exposure aperture of the camera with each exposure area of the film by counting two perforations using one photoreflector (to be referred to as a PR hereafter) or detecting two perforations using two PRs.

In addition, such a film allows accurate film feed control in a photographing operation using the camera, and also allows film feed control for accurate film alignment in a printing process after development in a laboratory. For this reason, this film is expected to prevent an inappropriate printing process in an automatic printing apparatus.

The stop position of even such a film sometimes slightly deviates from a correct position owing to variations in the power supply voltage of the motor or environmental changes such as changes in temperature and humidity in a film feed operation.

In addition, if the power to the device is turned off during a film feed operation, the stop position of the film greatly deviates from a correct position.

Even if a film feed operation is properly performed, the film may move due to vibrations from some cause.

If a film feed is performed to the next frame in such a state of positional deviation, perforations are erroneously counted by the above method of controlling a film feed operation by using one PR. As a result, the stop position of the film may deviate from a correct position by one perforation.

Once perforations are erroneously counted, the positional deviation remains with respect to the subsequent frames.

If the method of simultaneously detecting two perforations by using two PRs is used, the above problem of positional deviation with respect to each frame can be solved. However, two processing circuits for perforation detection signals are required, hindering the miniaturization of the camera, and resulting in an increase in cost.

BRIEF SUMMARY OF THE INVENTION

The present invention has been made to solve the above conventional problems, and has as its object to provide an improved, novel film feed device which can accurately align a film by using only one perforation sensor when the film position deviates from a predetermined position at the start of a film feed operation.

According to the first aspect of the present invention, there is provided a film feed device using a film having two perforations per frame, comprising:

film feed means for feeding the film;

perforation detection means for detecting one of the perforations while the film is fed by the film feed means;

perforation interval measuring means for measuring an interval between a perforation previously detected by the perforation detection means and a currently detected perforation;

perforation discrimination means for discriminating based on a perforation interval measured by the perforation interval measuring means whether the currently detected perforation is a perforation at which a film feed operation is to be stopped; and means for stopping the film feed operation when the perforation discrimination means discriminates that the currently detected perforation is a perforation at which the film feed operation is to be stopped.

According to the second aspect of the present invention, there is provided a film feed device comprising:

film feed means for feeding a film having two perforations per frame;

signal generating means for generating a signal in accordance with passage of an end portion of the perforation while the film is fed by the film feed means; and film stopping means for measuring an interval between signals generated by the signal generating means, and stopping the film feed operation based on the measurement result.

According to the third aspect of the present invention, there is provided a film feed device for feeding a film having two perforations per exposure area, comprising:

a driving mechanism for winding or rewinding the film;

a single perforation detection mechanism for outputting a signal upon detecting an end portion of the perforation during an operation of the driving mechanism;

measuring means for measuring an output interval between the signals output from the perforation detection mechanism;

calculation means for determining a stop position of the film by calculating a measurement value obtained by the measuring means; and a control circuit for stopping the driving means at the stop position.

According to the fourth aspect of the present invention, there is provided a film feed device using a film having two perforations per frame, comprising:

film feed means for feeding the film;

perforation detection means for outputting a signal in accordance with detection of an end portion of the perforation;

measuring means for measuring an output interval between the signals output from the perforation detection means while the film is fed by the film feed means;

calculation means for multiplying by a predetermined value the output interval measured by the measuring means; and control means for, after an end portion of the perforation is detected by the perforation detection means, determining to stop feeding the film when a next end portion of the perforation is detected before the film is moved by the amount calculated by the calculation means.

According to the fifth aspect of the present invention, there is provided a film feed device using a film having two perforations per frame, comprising:

film feed means for feeding the film;

perforation detection means for outputting a signal in accordance with passage of an end portion of the perforation;

measuring means for measuring a first output interval between the signals output from the perforation detection means and a second output interval different from the first output interval while the film is fed by the film feed means;

calculation means for comparing a ratio between the first and second output intervals measured by the measuring means with a predetermined value; and control means for determining to stop feeding the film based on a comparison result obtained by the calculation means.

According to the sixth aspect of the present invention, there is provided a film feed device using a film having two perforations per frame, comprising:

film feed means for feeding the film;

perforation detection means for inverting a state of an output signal at the start and end of detection of the perforation;

first time counting means for counting a time between the start and end of the detection of the perforation by the perforation detection means while the film is fed by the film feed means;

second time counting means for counting a time between the end of the detection of the perforation by the perforation detection means and the start of detection of a next perforation while the film is fed by the film feed means; and control means for stopping the film feed operation when the time counted by the second time counting means is shorter than a time obtained when the time counted by the first time counting means is multiplied by a predetermined value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a flow chart showing the operation of the camera incorporating the film feed device in FIGS. 1A and 1B;

FIGS. 7A to 7C are timing charts for explaining the "film wind" step in FIG. 6;

FIGS. 23A to 23C are timing charts for explaining the "film wind" step in FIG. 19.

DETAILED DESCRIPTION OF THE INVENTION

Figure 1A:
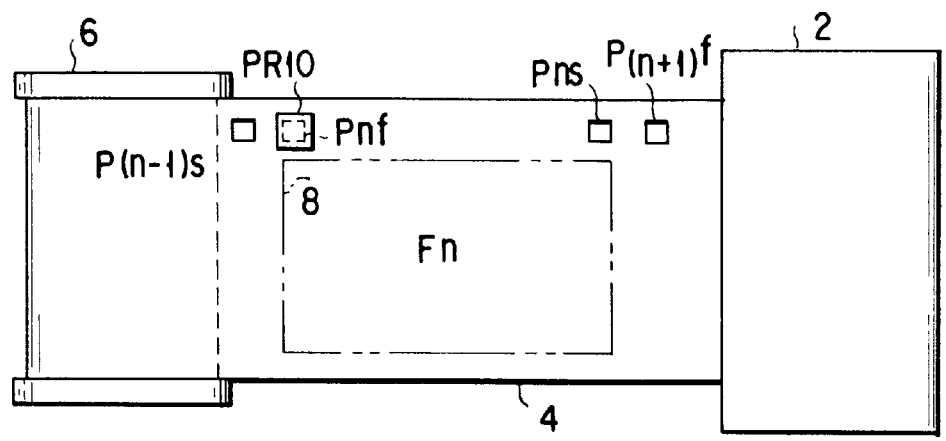
FIGS. 1A and 1B are views showing the arrangements of a film feed device and the characteristic part of a camera incorporating the device according to the first embodiment of the present invention when viewed from the rear and top sides of the camera.

Reference will now be made in detail to the presently preferred embodiments of the invention as illustrated in the accompanying drawings, in which like reference characters designate like or corresponding parts throughout the several drawings.

The embodiments of the present invention will be described below with reference to the accompanying drawing.

Figure 1B:
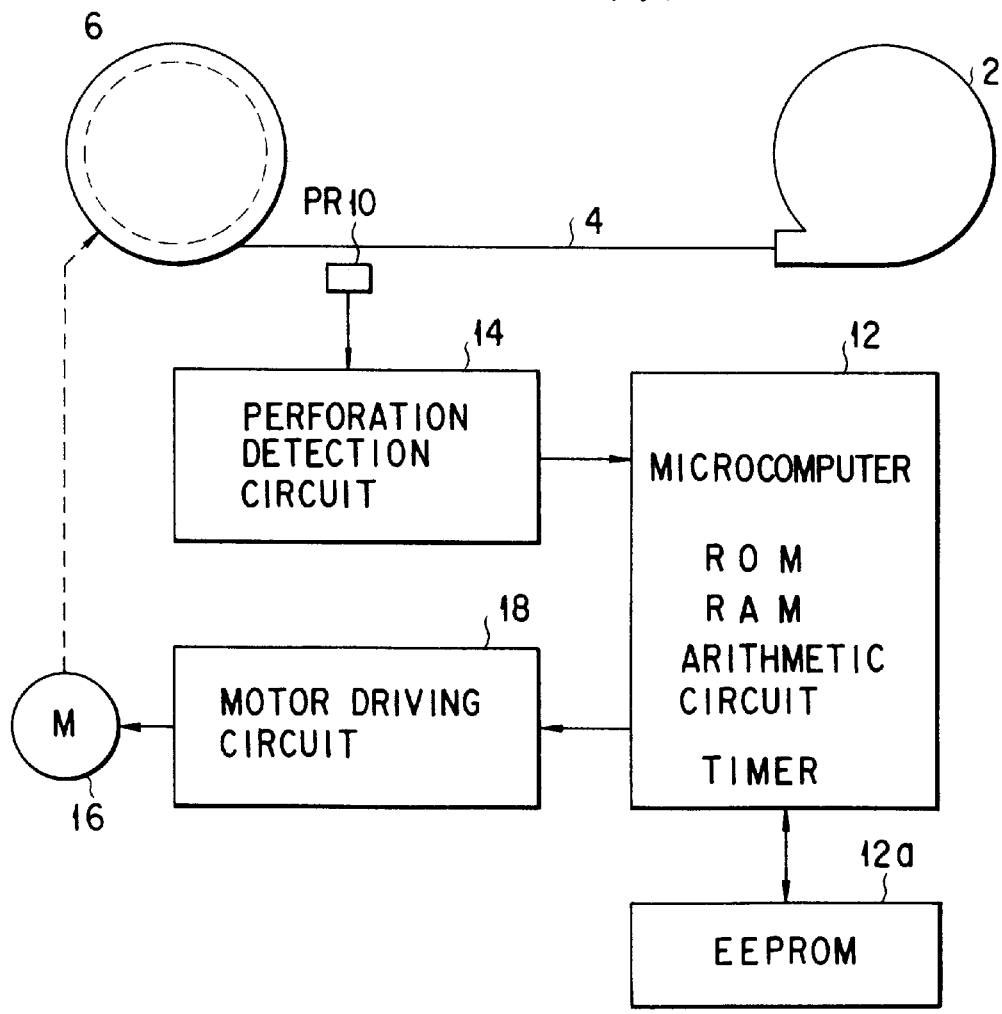

FIGS. 1A and 1B show the characteristic part of a camera incorporating a film feed device according to the first embodiment of the present invention.

FIG. 1A shows a state of the film feed device when viewed from the rear side of the camera, and more specifically, a state in which a film 4 fed from a film cartridge 2 is taken up by a take-up spool 6 of the camera. In this case, the film 4 has two perforations $P_{nf}$ and $P_{ns}$ per frame.

Referring to FIG. 1A, the area enclosed with the alternate long and two short dashed line corresponds to an exposure aperture 8 of the camera. In the state shown in FIG. 1A, the nth frame ($F_n$) of the film 4 is aligned with the exposure position.

Referring to FIG. 1A, reference symbols $P_{(n-1)s}$, $P_{nf}$, $P_{ns}$, and $P_{(n+1)f}$ denote four perforations of the film 4, which will be described in detail later.

As shown in FIG. 1A, each of the perforations has a rectangular shape which includes a front edge portion and a rear edge portion.

One photoreflector (to be referred to as a PR hereinafter) 10 is arranged to coincide with the position of the perforation $P_{nf}$ so as to detect the presence/absence of a perforation corresponding to the nth frame when the nth frame is at the exposure position.

When the PR 10 receives infrared light reflected by the film surface of the film 4 during a film feed operation, the PR 10 detects a film portion and outputs a signal of "High (H)" level. When the PR 10 detects no reflected light, the PR 10 detects a perforation portion and outputs a signal of "Low (L)" level. In this manner, the presence/absence of a perforation can be detected.

FIG. 1B shows the arrangement of this film feed device including a circuit portion when viewed from the top side of the camera.

A perforation detection circuit 14, a motor driving circuit 18, and an EEPROM 12a which is a nonvolatile memory are connected to a microcomputer 12 for controlling the overall operation of the film feed device and the camera. The perforation detection circuit 14 is connected to the PR 10. The motor driving circuit 18 is connected to a motor 16 for feeding the film 4. The EEPROM 12a stores various pieces of information.

A detection signal from the PR 10 is converted into a digital signal by the perforation detection circuit 14 first, and then output to the microcomputer 12.

The microcomputer 12 performs drive control of the motor 16 through the motor driving circuit 18.

The power of the motor 16 is transmitted to the take-up spool 6 through a gear train. As a result, the take-up spool 6 rotates to take up the film 4 from the film cartridge 2, thereby feeding the film 4.

The microcomputer 12 is constituted by a ROM storing programs, a RAM for storing control information, an arithmetic circuit for performing various arithmetic operations, a timer for performing a time counting operation, and the like.

Figure 2:
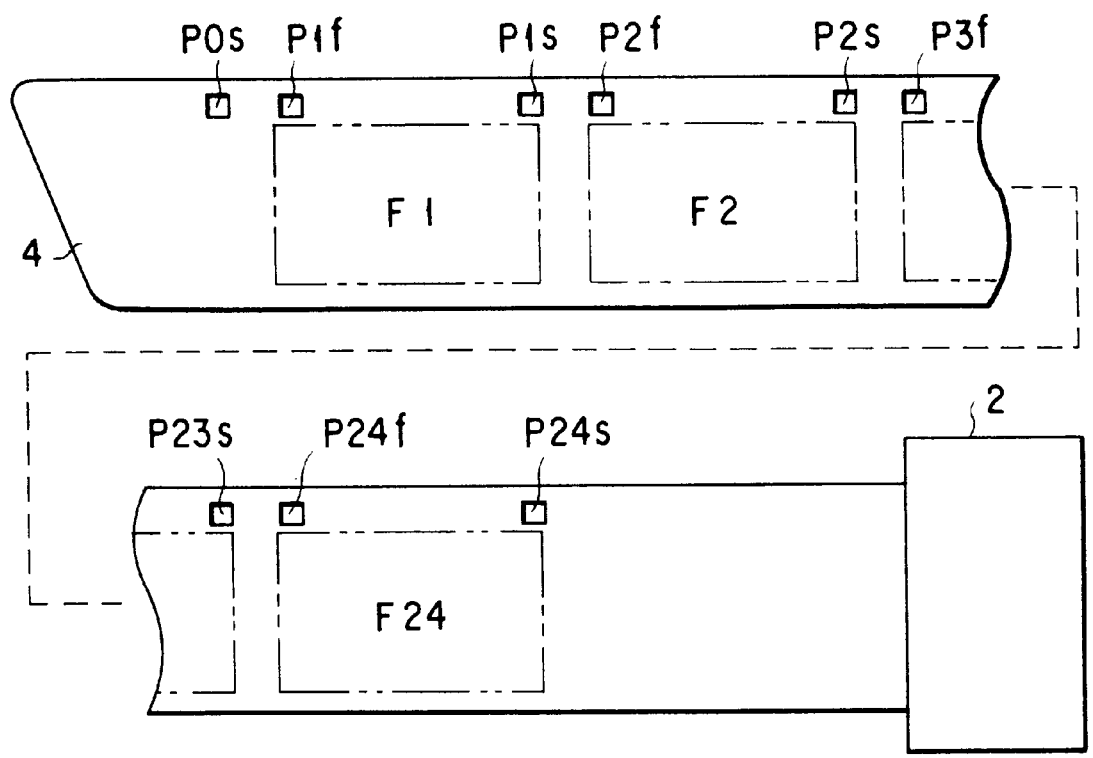
FIG. 2 is a view showing the structure of a film used in the film feed device in FIGS. 1A and 1B.

FIG. 2 shows the structure of the film used in this film feed device, and more specifically, a state in which the film 4 is drawn from the film cartridge 2.

The exposure area of each frame is defined by the area enclosed with the alternate long and two short dashed line. The respective exposure areas are denoted by F1, F2, . . . , F24 from the film leader side.

FIG. 2 shows a 24 exposure film as an example.

Each frame has two corresponding perforations. For example, the perforations corresponding to the nth frame ($F_n$) are denoted by $P_{nf}$ and $P_{ns}$.

In this case, the suffix "f" indicates that the perforation is located on the leader side, and the suffix "s" indicates that the perforation is located on the cartridge side.

The operation of the camera incorporating this film feed device will be described next with reference to the flow chart of FIG. 3.

This flow chart is based on a portion, of the operation of the camera, which is required to describe the present invention.

When a battery is loaded into the camera, and the power switch (not shown) is turned on, the microcomputer 12 is started, and the programs stored in the ROM incorporated in the microcomputer 12 are sequentially executed.

First of all, the microcomputer 12 reads out a "film winding flag" from the EEPROM 12a connected to the microcomputer 12, and writes the flag in the RAM incorporated in the microcomputer 12 (step S100).

The microcomputer 12 checks on the basis of the loaded "film winding flag" whether the film 4 is being wound (step S101).

As will be described later, this "film winding flag" is set to "1" and stored in the EEPROM 12a while the film 4 is being wound, i.e., in the interval between the start of a film wind operation and the end of the film wind operation.

If it is determined in step S101 that the "film winding flag" is set to "1", it indicates that the film wind operation is not completed.

That is, the battery is dead or the like during a film wind operation, and the power is restored while the one-frame film wind operation is not completed.

The microcomputer 12 performs the following restoring operation.

The microcomputer 12 drives the motor 16 through the motor driving circuit 18 to perform a one-frame film wind operation to complete the film wind operation (step S102).

This film wind operation is the same as the normal one-frame film wind operation in step S109 to be described later. This operation will be described in detail later.

Subsequently, since the film wind operation is completed in step S102, the microcomputer 12 clears the "film winding flag" stored in the RAM to "0" (step S103), and writes/stores this flag in the EEPROM 12a (step S104).

If it is determined in step S101 that no film wind operation is being performed, the flow jumps to step S105.

The microcomputer 12 checks whether the release button (not shown) is depressed (step S105).

If the release button is not depressed, a standby state is set. If the release button is depressed, the microcomputer 12 executes a photographing operation following the procedure after step S106.

First of all, the microcomputer 12 drives the shutter (not shown) to expose the film 4 (step S106).

The microcomputer 12 then sets the "film winding flag" stored in the RAM to "1" (step S107), and writes/stores the flag in the EEPROM 12a (step S108).

The microcomputer 12 drives the motor 16 through the motor driving circuit 18 to wind the film 4 by one frame, thus preparing for the next photographing operation (step S109).

When the film wind operation is completed, the microcomputer 12 clears the "film winding flag" stored in the RAM to "0" (step S110), and writes/stores the flag in the EEPROM 12a (step S111).

With the processing in steps S107 to S111, information indicating that a film wind operation is being performed is stored in the EEPROM 12a which is a nonvolatile memory while the film wind operation is performed in step S109.

If, therefore, the battery is removed during the execution of a film wind operation in step S109, since steps S110 and S111 are not executed, the "film winding flag" is kept at "1" in the EEPROM 12a.

With this processing, when the battery is loaded again, the above restoring operation in steps S100 to S104 can be performed.

A procedure for the "film wind operation" in steps S102 and S109 in FIG. 3 will be described in detail next with reference to the flow chart of FIG. 4.

During a film wind operation, the microcomputer 12 clears a "time T counting flag" to "0", which is set to "1" while a time T required for a perforation to pass through the photoreflector (PR) 10 is counted (step S200).

The microcomputer 12 also clears a "time kT counting flag" to "0", which is set to "1" while the time obtained by multiplying the time T by a given constant (k) is counted (step S201).

Subsequently, the microcomputer 12 clears a "pre-PR state flag" to "0", which is used to store the state of a PR signal detected by the PR 10 (step S202).

As will be described later, the "pre-PR state flag" is set to "1" when the PR signal is at "H" level during a film feed operation, and cleared to "0" when the PR signal is at "L" level.

After the above initialization is performed, the microcomputer 12 drives the motor 16 through the motor driving circuit 18 to start winding the film 4 (step S203).

The microcomputer 12 monitors the PR signal to detect whether the PR signal is at "H" level or "L" level, thereby detecting the presence/absence of a perforation (step S204).

If a perforation is at the position of the PR 10, the PR signal is set at "L" level. The microcomputer 12 therefore checks whether the "pre-PR state flag" is "0" or "1" (step S205).

If it is determined in step S205 that the "pre-PR state flag" is cleared to "0", since it indicates that a perforation is passing through the PR 10, the flow returns to step S204 to keep monitoring the PR signal until the perforation completely passes through the PR 10.

If it is determined in step S205 that the "pre-PR state flag" is set to "1", since it indicates that an end of the perforation which is located on the film leader side is detected, the microcomputer 12 clears the "pre-PR state flag" to "0" (step S206), thereby setting the "pre-PR state flag" at the same level as that of the PR signal.

The microcomputer 12 then checks whether the "time kT counting flag" is "0" or "1" (step S207).

That is, the microcomputer 12 checks on the basis of the "time kT counting flag" that the detected end of the perforation corresponds to the perforation at which the film wind operation is to be stopped, i.e., the perforation $P_{nf}$ for a film feed operation for the nth frame.

As will be described later, if the "time kT counting flag" is set to "1", the microcomputer 12 can determined that the detected perforation is the corresponding perforation. The microcomputer 12 therefore stops the motor 16 (step S208) to complete the film wind operation.

If it is determined step S207 that the "time kT counting flag" is cleared "0", i.e., it is determined that the detected perforation is not the corresponding perforation, the microcomputer 12 starts the timer to count the passing time T of the perforation (step S209), and sets the "time T counting flag" to "1" (step S210). Thereafter, the flow returns to step S204.

If it is determined in step S204 that the PR signal is at "H" level, i.e., no perforation is positioned on the PR 10, the microcomputer 12 checks whether the "pre-PR state flag" is "0" or "1", as in step S205 (step S211).

If the "pre-PR state flag" is cleared to "0", it indicates that the PR signal has changed from "L" level to "H" level, i.e., an end of a perforation which is located on the cartridge side is detected. The microcomputer 12 therefore sets the "pre-PR state flag" to "1" (step S212) to set the "pre-PR state flag" at the same level as that of the PR signal.

Subsequently, the microcomputer 12 checks the "time T counting flag" (whether it is set to "0" or "1") to check whether the passing time T of the perforation is being counted (step S213).

If the microcomputer 12 determines that the passing time T is not being counted, the flow returns to step S204. If the passing time T is being counted, the microcomputer 12 stops the timer which has been started in step S209 (step S214).

The microcomputer 12 clears the "time T counting flag" to "0" (step S215), and multiplies the counted passing time T of the perforation by k (step S216). Thereafter, the microcomputer 12 starts the timer for counting the calculated time kT (step S217), and sets the "time kT counting flag" to "1" (step S218). The flow then returns to step S204.

If it is determined in step S211 that the "pre-PR state flag" is set to "1", it indicates that a film portion is passing through the PR 10. The microcomputer 12 therefore checks whether the "time kT counting flag" is set to "0" or "1" (step S219).

If the microcomputer 12 determines that the time kT is not being counted, the flow returns to step S204. If the time kT is being counted, the microcomputer 12 checks whether the time kT has been counted by the timer started in step S217 (step S220).

If the microcomputer 12 determines that the time kT has not elapsed, the flow returns to step S204. If the time kT has elapsed, the microcomputer 12 clears the "time kT counting flag" to "0" (step S221). The flow then returns to step S204.

With the above processing, the film wind operation is completed.

As described above, according to the first embodiment, when a perforation portion of the film 4 passes through the photoreflector (PR) 10, the "time kT counting flag" is set until the time k times the time T elapses. If the next perforation moves to the position of the PR 10 within this time, it is determined that the film wind operation is completed.

Figure 4:
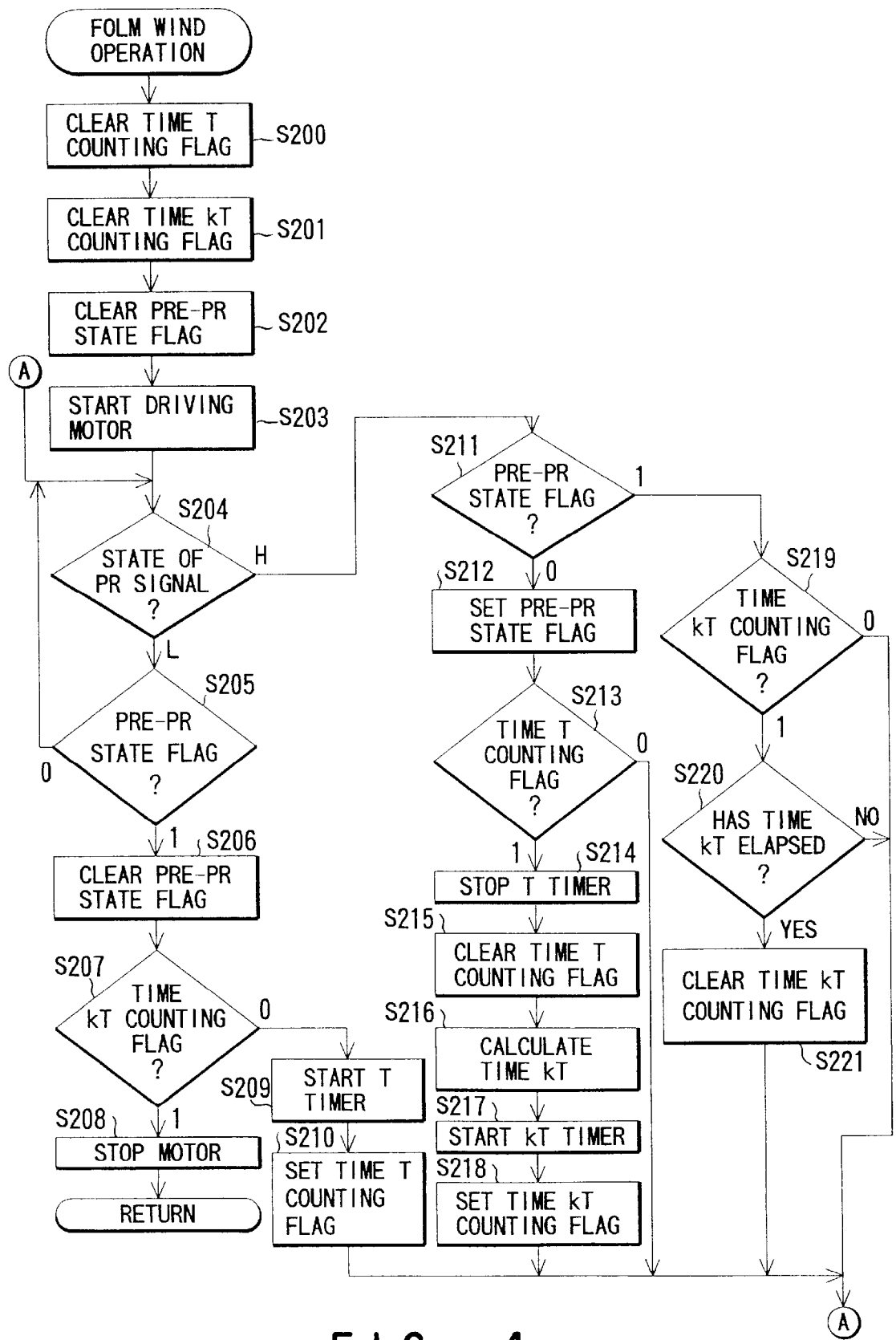
FIG. 4 is a flow chart showing a procedure for the "film wind" step in the flow chart of FIG. 3.

FIGS. 5A to 5E are timing charts for explaining the "film wind" step in FIG. 4.

In the following description, it is assumed that a film feed operation is performed from the frame $F_n$ to the frame F(n+1).

Figure 5A:
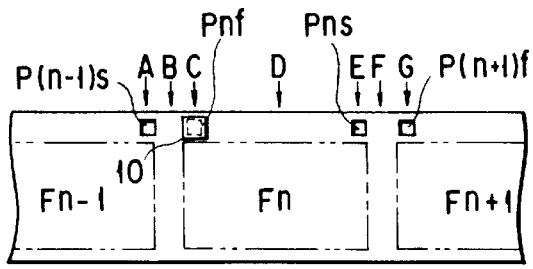
FIGS. 5A to 5E are timing charts for explaining the "film wind" step in FIG. 4.

Referring to FIG. 5A, the PR 10 in FIGS. 1A and 1B relatively moves from the left to the right, and the film feed operation is stopped when the PR 10 coincides with a position G in FIG. 5A.

In practice, a film feed operation may start from any position. Consider, in this case, points A to D as film feed start points, respectively, i.e., the point A (the PR 10 coincides with the perforation $P_{(n-1)s}$, the point B (the PR 10 coincides with the midpoint between the perforations $P_{(n-1)s}$ and $P_{nf}$), the point C (the PR 10 coincides with the perforation $P_{nf}$), and the point D (the PR 10 coincides with the midpoint between the perforations $P_{nf}$ and $P_{ns}$)

Figure 5B:
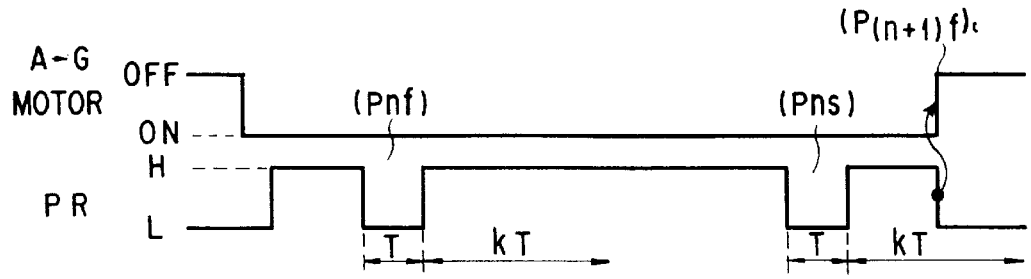
Figure 5C:
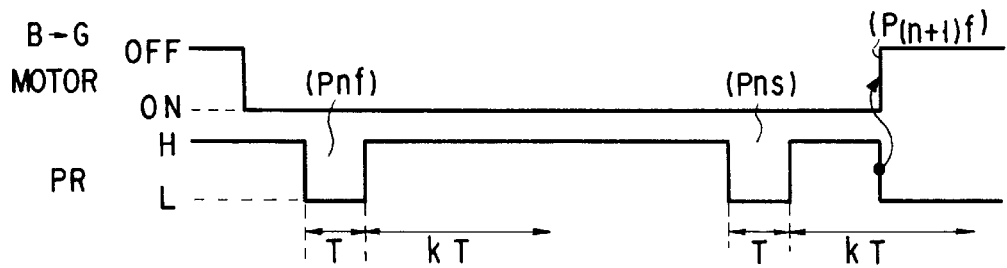

When a film feed operation is started from the point A or B and stopped at the point G, the perforation $P_{nf}$ passes through the PR 10 first after the motor 16 is driven to start a film wind operation. The next perforation $P_{ns}$ is not detected within the time k times the time T required for the perforation $P_{nf}$ to pass through the PR 10, as shown in FIGS. 5B and 5C.

In this case, therefore, detection of the perforation $P_{nf}$ is neglected in effect.

When the perforation $P_{(n+1)f}$ is detected within the time k times the time T required for the perforation $P_{ns}$ to pass through the PR 10, the film wind operation is stopped. Therefore, the film wind operation is properly performed, i.e., the exposure area $F_{n+1}$ of the film is accurately aligned with the aperture of the camera.

Figure 5D:
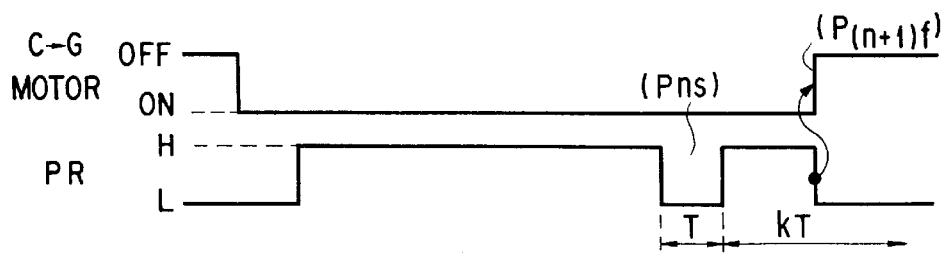
Figure 5E:
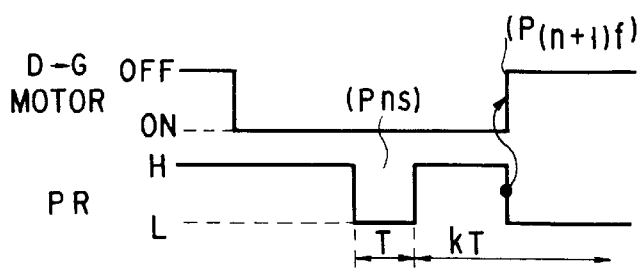

When a film feed operation is started from the point C or D and stopped at the point G, the perforation $P_{ns}$ passes through the PR 10 first after a film wind operation is started, as shown in FIGS. 5D and 5E. Since the next perforation $P_{(n+1)f}$ is detected within the time k times the time T required for the perforation $P_{(n+1)f}$ to pass through the PR 10, the film wind operation is also properly performed.

As described above, if some abnormality occurs, e.g., the battery is removed during a film wind operation, a film feed operation may be started from a point E or F.

In the case of the point E or F, the same control as in the case of A (start point) →G (end point) or B (start point) →G (end point). For this reason, the film is wound by one extra frame, and the film feed operation is stopped at the (n+2)th frame.

This operation can prevent the worst case of double exposure, and also prevent an erroneous film wind operation afterward.

Letting $L_p$ be the length of each perforation, Ls be the shorter perforation interval, and Ll be the longer perforation interval, it suffices to set the constant k within the range of Ls/Lp<k<Ll/Lp.

In practice, however, it suffices if the constant k is set near the middle value in the above range in consideration of film feed speed variations and variations in digitizing the PR signal.

The above description is associated with a case wherein when the nth frame of the film is at the exposure position, the PR 10 is placed to coincide with the position of the perforation $P_{nf}$.

Assume that the PR 10 is placed at the midpoint between the perforations $P_{(n-1)s}$ and $P_{nf}$ or between the perforations $P_{(n-1)s}$ and $P_{(n-1)f}$. In this case, the passing time of a perforation interval is counted, and a film wind operation is stopped when a trailing end portion of the perforation used to stop the above time counting operation is detected within the time obtained by multiplying the passing time by a predetermined value (1/k), thereby realizing the same control as that described above.

Figure 6:
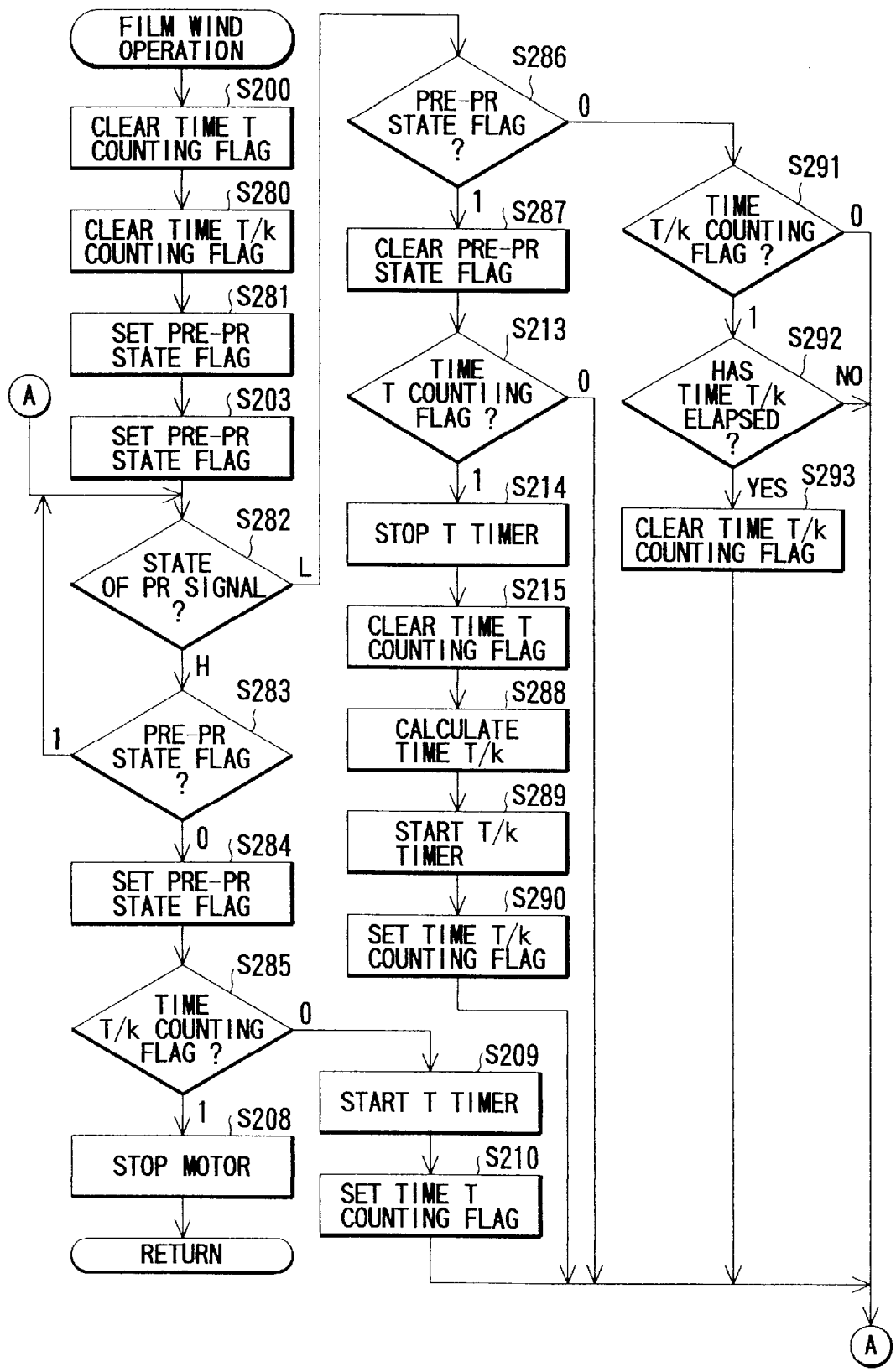
FIG. 6 is a flow chart showing a modification of the procedure for the "film wind" step in FIG. 4.

FIG. 6 is a flow chart showing a modification of the procedure for this control processing in FIG. 4.

The same reference symbols in FIG. 6 denote the same operations as in FIG. 4, and a description thereof will be omitted.

In this control processing, as shown in FIG. 7A, the PR 10 is placed at a position offset from an end portion of the perforation $P_{(n-1)s}$ which is located on the perforation $P_{nf}$ side toward the perforation $P_{nf}$.

In these cases, since a reference time is measured at perforation intervals, the logic of all the operations associated with the PR signal is inverted with respect to that in FIG. 4.

The logic in steps S202, S204, S205, S206, S211, and S212 in FIG. 4 is therefore inverted as that in steps S281, S282, S283, S284, S286, and 287 in FIG. 6.

In addition, since a time corresponding to the time kT used for stop position determination in FIG. 4 is given T/k, the operations associated with the time kT in steps S201, S207, S216, S217, S218, S219, S220, and S221 in FIG. 4 are replaced with the operations associated with the time T/k in steps S280, S285, S288, S289, S290, S291, S292, and S293 in FIG. 6.

When a film wind operation is started from a correct position in the arrangement shown in FIG. 7A, since the PR 10 passes through the perforation $P_{ns}$ within the time T/k the predetermined time T after the PR 10 passes through the perforation $P_{nf}$, the film wind operation can be properly stopped at the trailing end portion of the perforation $P_{ns}$, as shown in FIG. 7B.

If a film wind start position deviates from a correct position in the arrangement shown in FIG. 7A, the PR 10 passes through the perforation $P_{nf}$ within the time T/k the predetermined time T after the PR 10 passes through the perforation $P_{(n-1)s}$, as shown in FIG. 7C. In this case, however, since the time T is short, it is determined that the film wind operation should not be stopped at the next perforation. When the PR 10 passes through the perforation $P_{ns}$ within the time T/k after the predetermined time T lapses again, the film wind operation can be properly stopped at the trailing end portion of the perforation $P_{ns}$.

Figure 8:
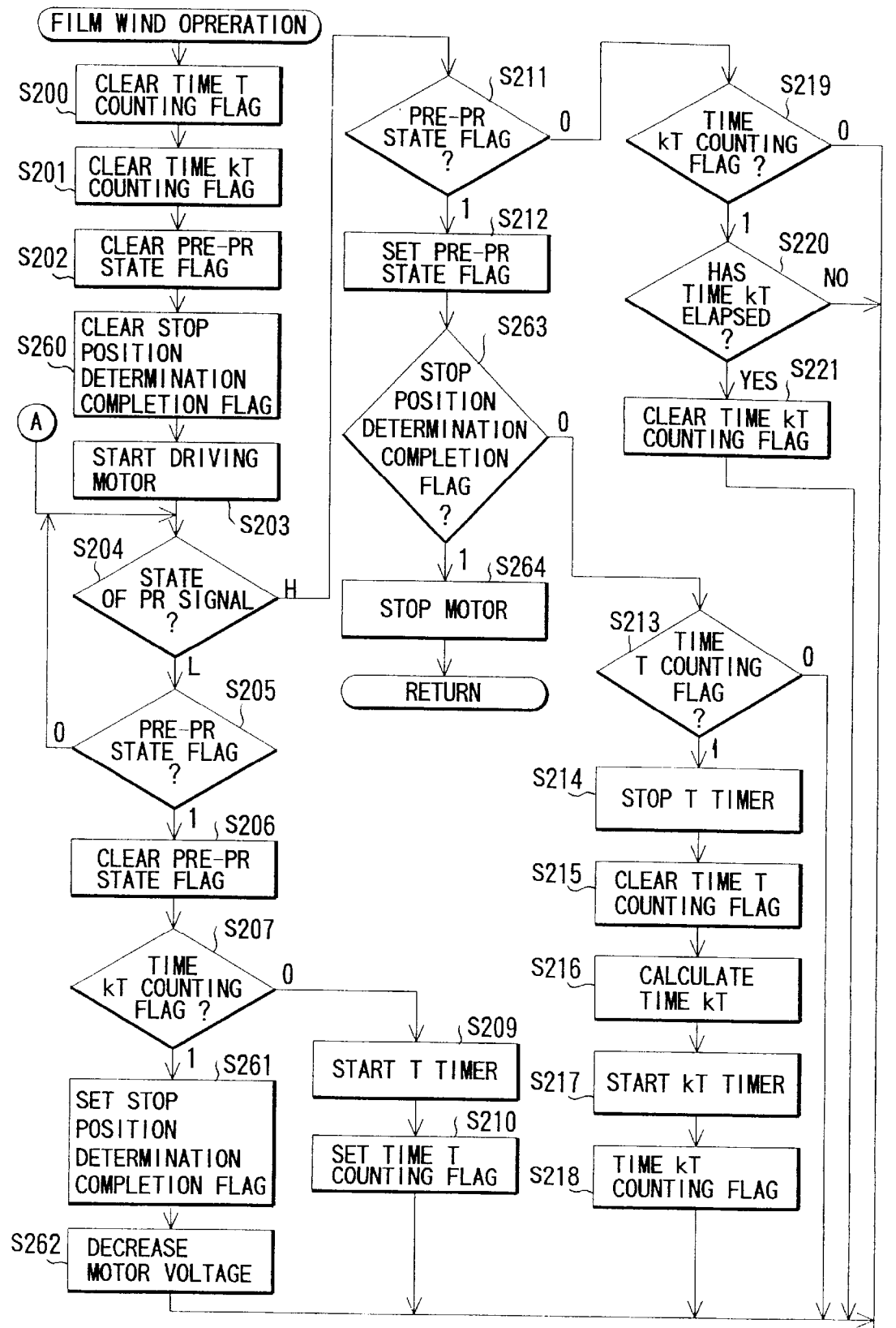
FIG. 8 is a flow chart showing another modification of the procedure for the "film wind" step in FIG. 4.

FIG. 8 shows another modification of the flow chart shown in FIG. 4.

The same reference symbols in FIG. 8 denote the same operations as in FIG. 4, and a description thereof will be omitted.

Figure 9A:
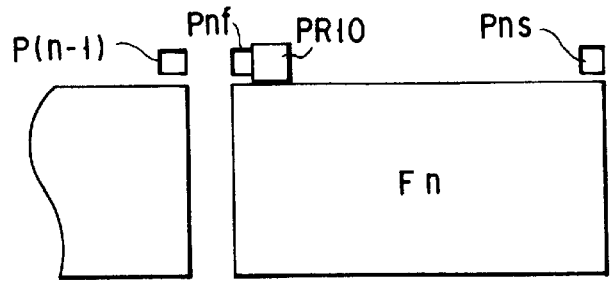
FIGS. 9A to 9C are timing charts for explaining the "film wind" step in FIG. 8.

In this case, as shown in FIG. 9A, the PR 10 is placed at a position offset from the end portion of the perforation $P_{nf}$ which is located on the perforation $P_{ns}$ side toward the perforation $P_{ns}$.

In steps S260 to S264 in FIG. 8, which differ from those in FIG. 4, the microcomputer 12 performs the processing as follows:

In step S260, the microcomputer 12 clears a stop position determination completion flag.

In step S261, the microcomputer 12 sets the stop position determination completion flag.

Referring to FIG. 4, the stop position is the position where a film feed operation is stopped. In this case, however, only a stop position is determined, but the actual stop position is the position where the end portion of the next perforation is detected.

In step S262 which is not necessarily required, the microcomputer 12 decreases the driving voltage to the motor to improve the stop position precision even in a high-speed film feed operation.

In step S263, the microcomputer 12 checks the stop position determination completion flag. If a stop position has already been determined, the motor is stopped in step S264 to stop the film wind operation.

This processing will be described next with reference to the timing charts of FIGS. 9B and 9C.

Figure 9B:
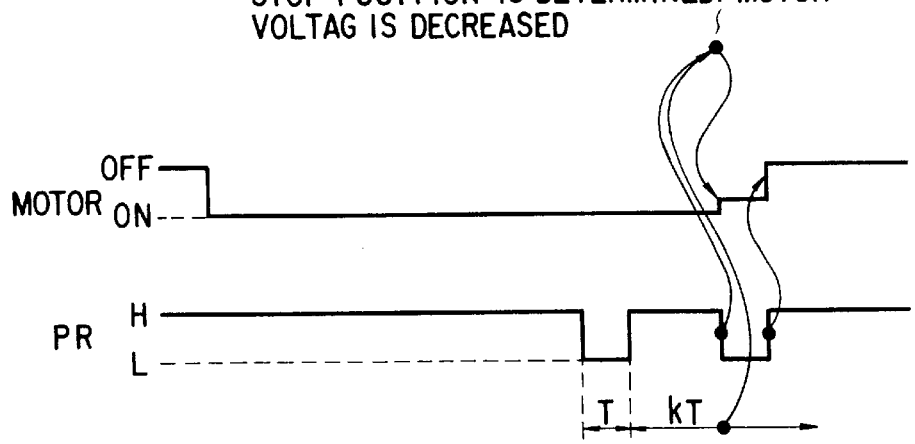
Figure 9C:
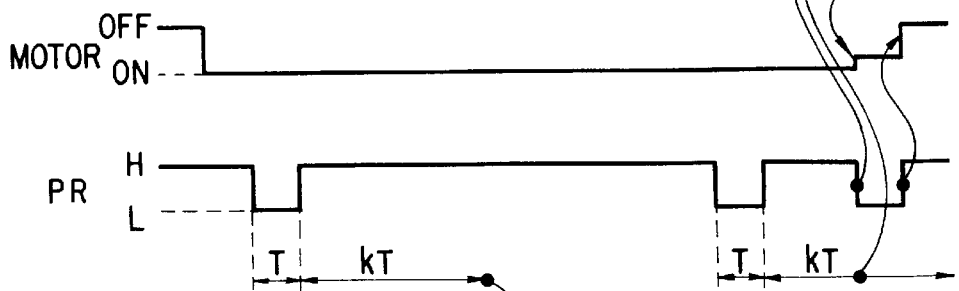

When a film wind operation is started from a correct position, the end portion of the next perforation is detected before the lapse of the time (kT) obtained when the time (T) required for the first perforation to pass through the PR 10 is multiplied by a predetermined value, as shown in FIG. 9B. At this time, it is therefore determined that the motor is stopped when the end portion of the next perforation is detected (stop position determination). The motor is then actually stopped in accordance with the detection of the end portion of the next perforation, thus completing the film feed operation.

In this case, when a stop position is determined, the effective driving voltage to the motor is simultaneously changed to decrease the feed speed. An improvement in stop position precision can therefore be expected.

When a film wind start position deviates from a correct position, the next perforation is not detected after the lapse of the time obtained when the time required for the perforation detected first to pass through the PR 10 is multiplied by a predetermined value. Film feed stop control can be performed at the next correct position.

According to the above description, the degree of freedom of the stop position of a film, i.e., the position of the PR 10, increases.

Assume that the PR 10 is placed to coincide with the position of the perforation $P_{(n-1)s}$ when the nth frame of the film is at the exposure position. In this case, the passing time of a perforation is counted first, and a film wind operation is stopped when the next perforation is detected after the lapse of the time obtained by multiplying the passing time by a predetermined value (k). With this operation, the same control as that described above can be performed.

Such a control operation will be described below with reference to the flow chart of FIG. 10.

Figure 10:
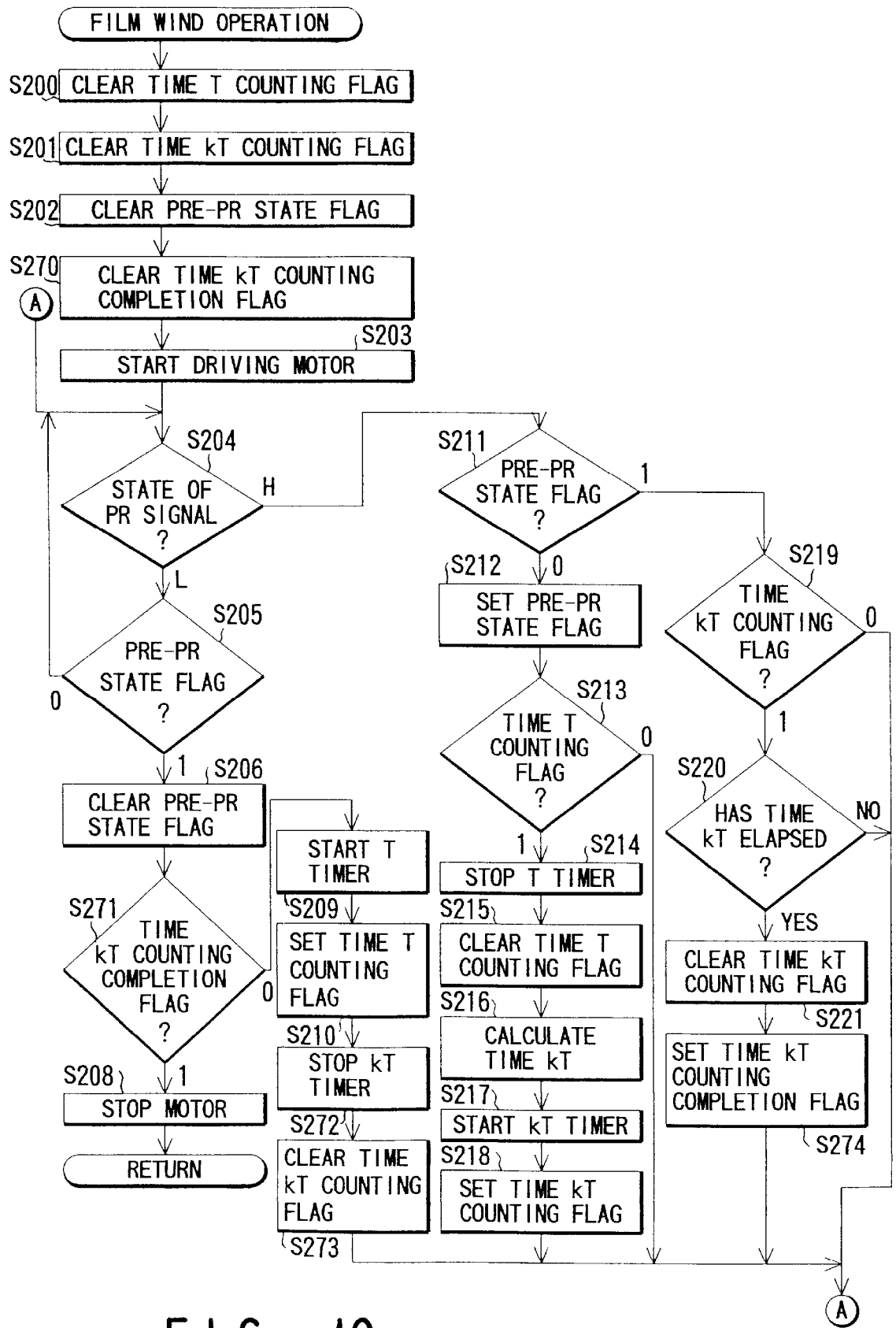
FIG. 10 is a flow chart showing still another modification of the procedure for the "film wind" step in FIG. 4.

The same reference symbols in FIG. 10 denote the same operations as in FIG. 4, and a description thereof will be omitted.

Figure 11A:
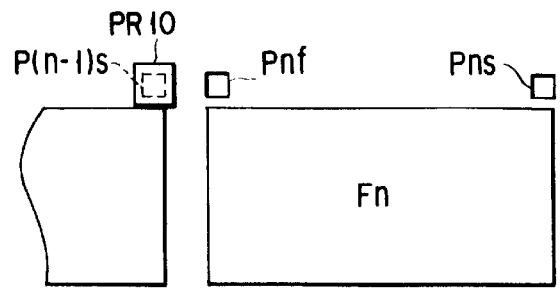
FIGS. 11A to 11C are timing charts for explaining the "film wind" step in FIG. 10.

In this case, as shown in FIG. 11A, the PR 10 is located at the position of the perforation $P_{(n-1)s}$.

In steps S270 to S724 in FIG. 10, which differ from those in FIG. 4, the microcomputer 12 performs the following processing:

In step S270, the microcomputer 12 clears a time kT counting completion flag.

In step S271, the microcomputer 12 checks the time kT counting completion flag. If the time kT has already been counted, the microcomputer 12 determines that the detected end portion of the perforation is the position where the film is to be stopped. In step S208, the microcomputer 12 stops the motor to complete the film wind operation.

If it is determined in step S271 that the time kT has not been counted, the microcomputer 12 stops the kT timer in step S272 through steps S209 and S210 as in the procedure shown in FIG. 4. In step S273, the microcomputer 12 clears the time kT counting flag.

In step S274, since the time kT counting operation is terminated without detecting any perforation, the time kT counting completion flag is set.

Figure 11B:
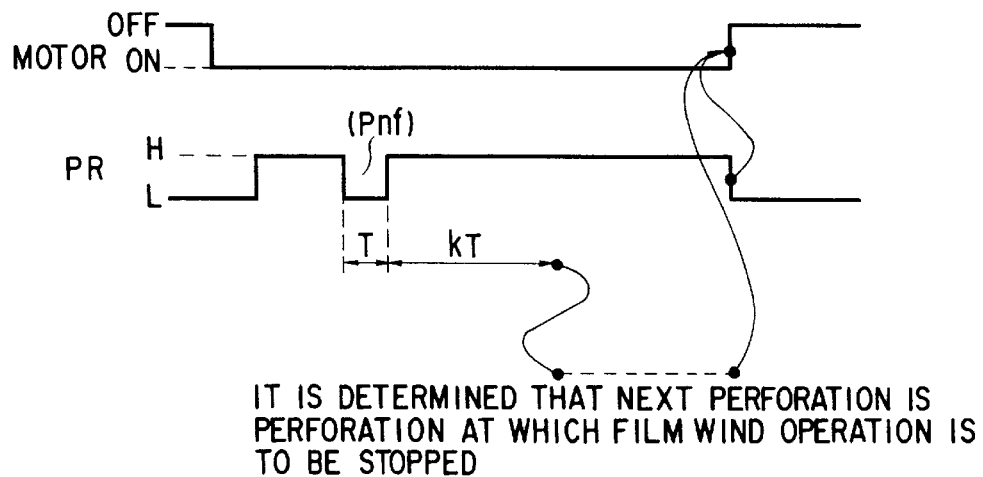
Figure 11C:
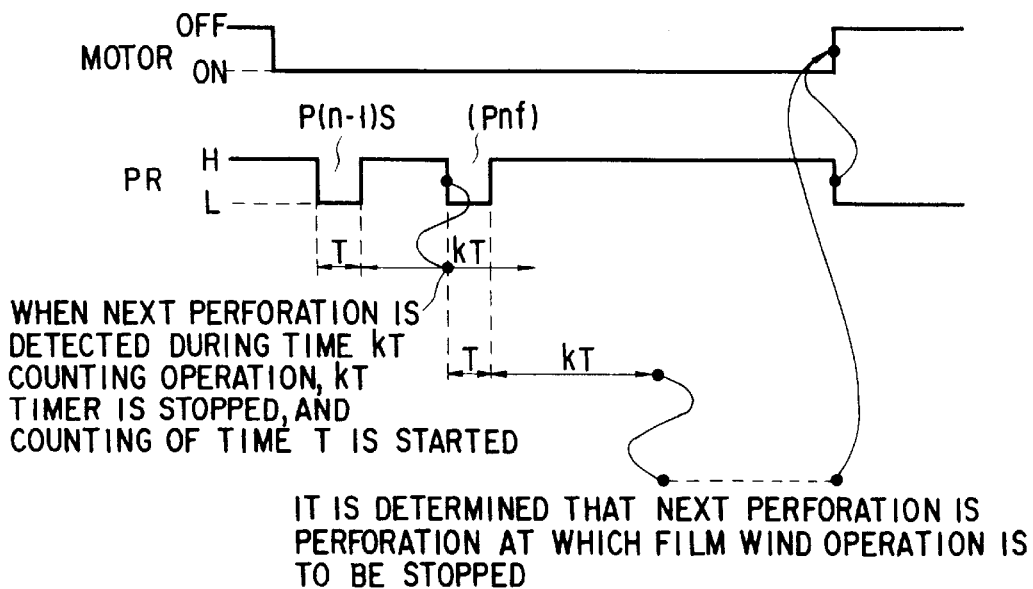

This processing will be described next with reference to the timing charts of FIGS. 11B and 11C.

When a film wind operation is started from a correction position, the end portion of the next perforation is detected first after the lapse of the time (kT) obtained when the time (T) required for the first perforation to pass through the PR 10 is multiplied by a predetermined value. The end portion of the perforation is therefore determined as the position where the film is to be stopped. The motor is then stopped to complete the film feed operation.

When a film wind start position deviates from a correct position, since the next perforation is detected before the lapse of the time obtained by when the timer required for the first detected perforation to pass through the PR 10 is multiplied by a predetermined value, film feed stop control is performed at the next correct position.

According to the above description, the degree of freedom of the stop position of a film, i.e., the position of the PR 10, increases.

Still another modification of the control procedure will be described next with reference to the flow chart of FIG. 12.

Figure 12:
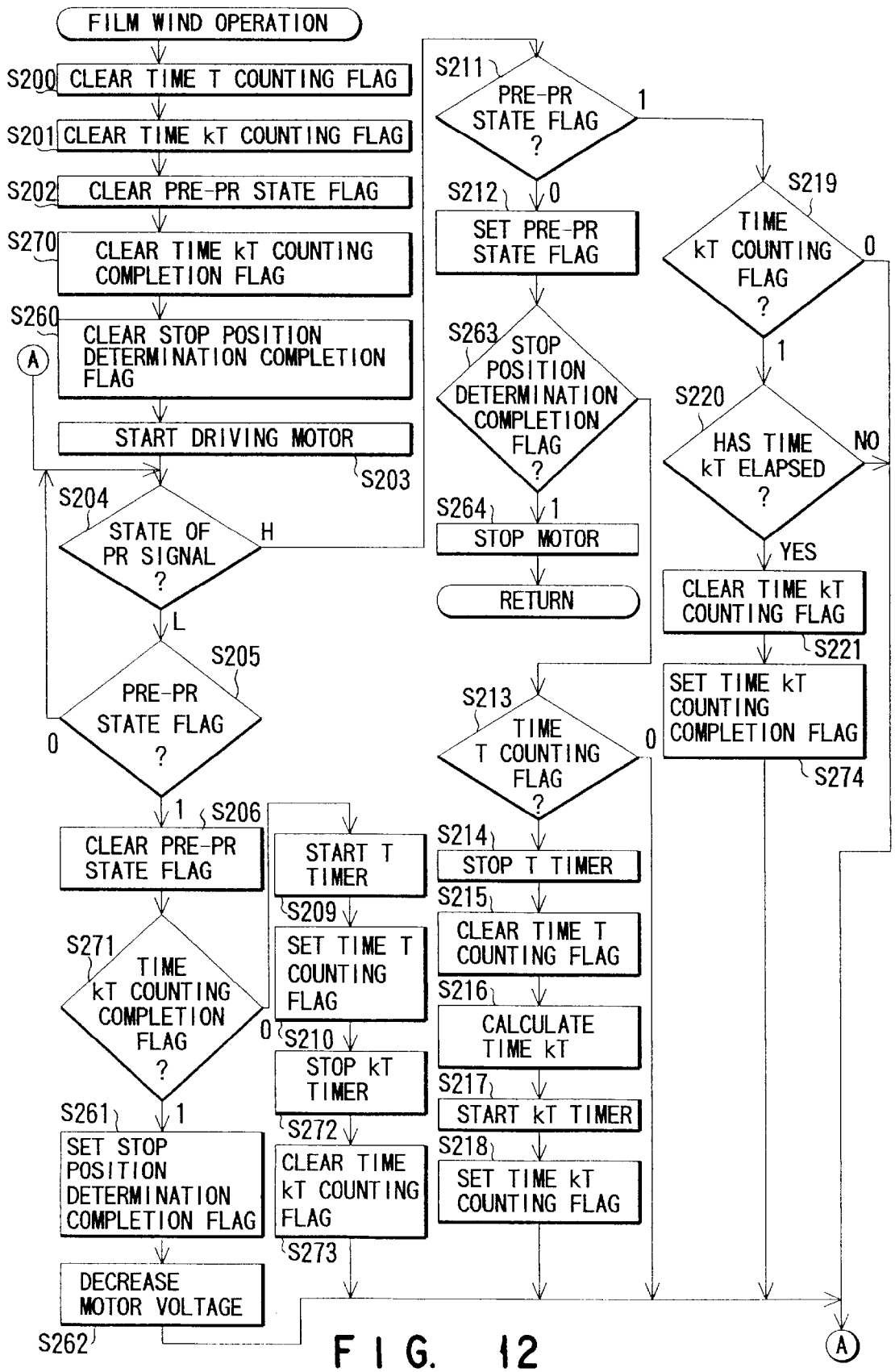
FIG. 12 is a flow chart showing still another modification of the procedure for the "film wind" step in FIG. 4.

The same reference symbols in FIG. 12 denote the same operations as in FIGS. 4, 8, and 10, and a description thereof will omitted.

Figure 13A:
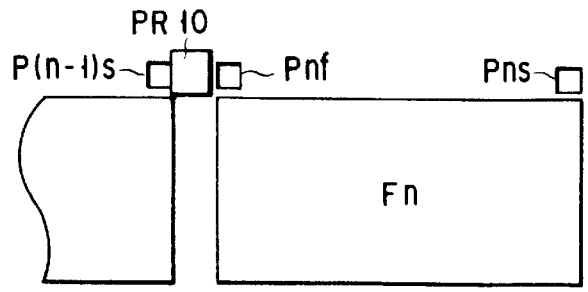
FIGS. 13A to 13C are timing charts for explaining the "film wind" step in FIG. 12.

In this case, as shown in FIG. 13A, the PR 10 is located at a position offset from the end portion of the perforation $P_{(n-1)s}$ which is located on the perforation $P_{nf}$ side toward the perforation $P_{nf}$.

This processing will be described next with reference to the timing charts of FIGS. 13B and 13C.

Figure 13B:
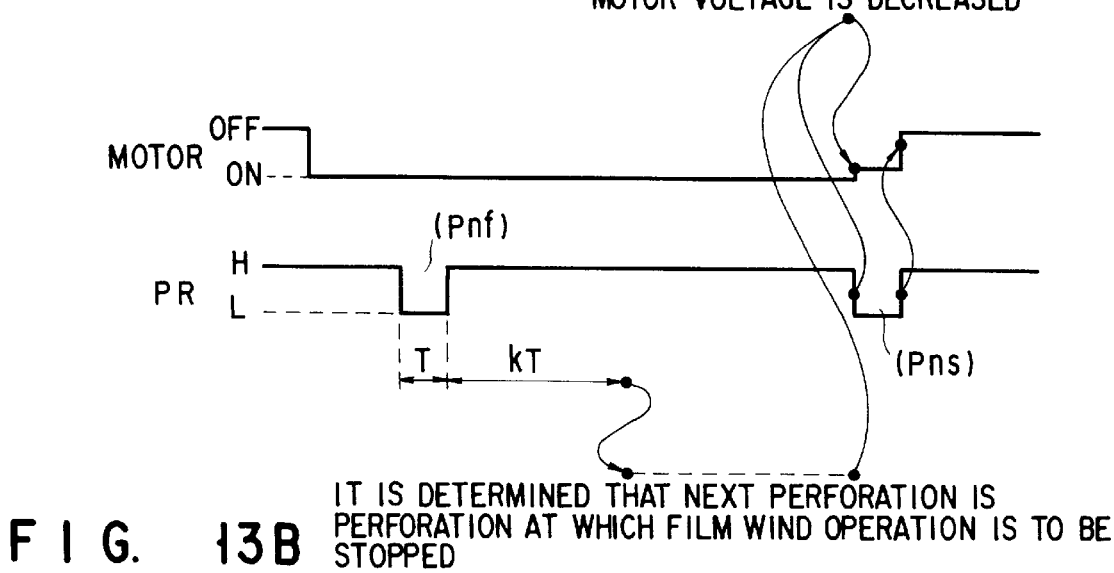
Figure 13C:
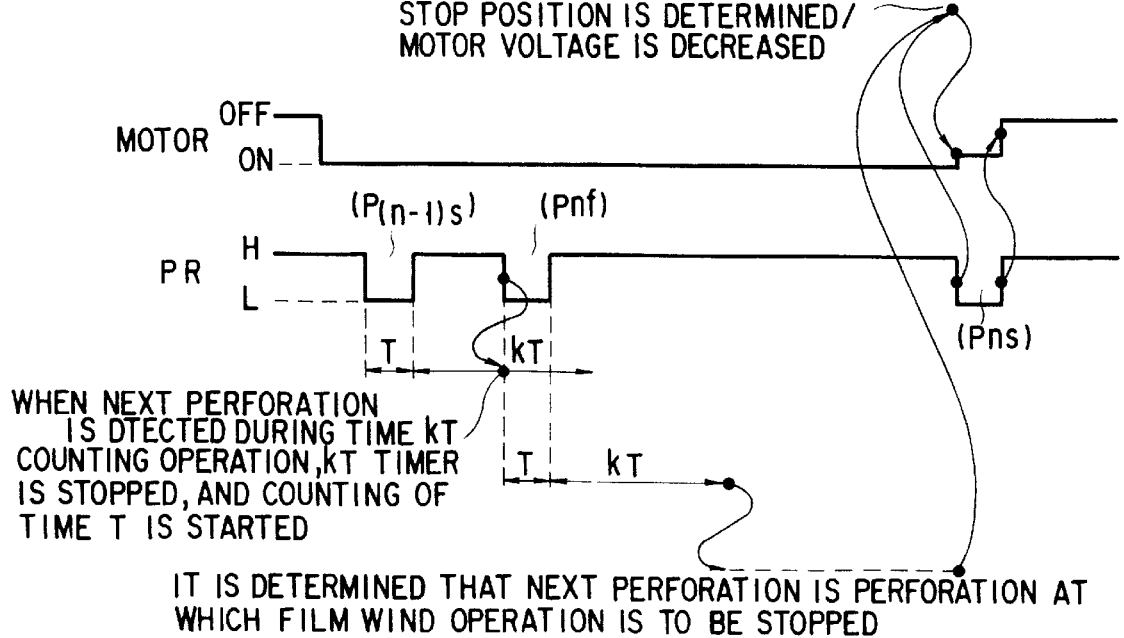

When a film wind operation is started from a correct position, the end portion of the next perforation is detected first after the lapse of the time (kT) obtained when the time (T) required for the first perforation to pass through the PR 10 is multiplied by a predetermined value, as shown in FIG. 13B. At this time, therefore, it is determined that the motor is stopped when the trailing end portion of a perforation is detected (the determination of the motor stop position). The motor is actually stopped in accordance with the detection of the end portion of the perforation, thus completing the film feed operation.

When a film wind start position deviates from a correct position, the next perforation is detected before the lapse of the time obtained when the time required for the first detected perforation passes through the PR 10 is multiplied by a predetermined value. Film feed stop control is therefore performed at the next correct position.

According to the above description, the degree of freedom of the stop position of a film, i.e., the position of the PR 10, increases.

Still another modification of the "film wind operation" in FIG. 4 will be described next with reference to the flow chart of FIG. 14.

Figure 14:
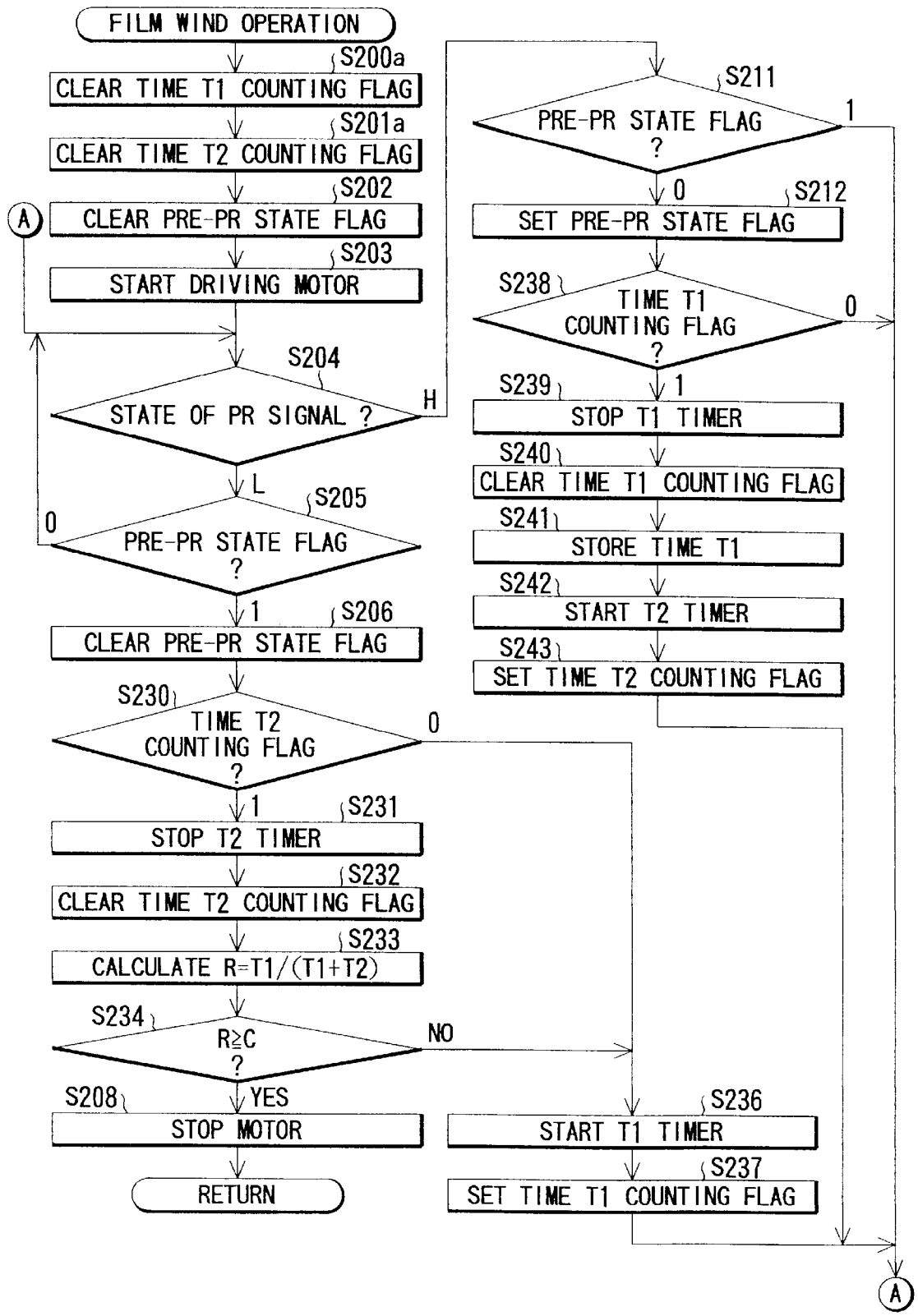
FIG. 14 is a flow chart showing still another modification of the procedure for the "film wind" step in FIG. 4.

The same reference symbols in the flow chart of FIG. 14 denote the same operations as in the flow chart of FIG. 4 or operations corresponding thereto, and a description thereof will omitted.

First of all, the microcomputer 12 clears a "time T1 counting flag" to "0" (step S200a). The "time T1 counting flag" indicates that a passing time T1 of a perforation with respect to the photoreflector (PR) 10 is being counted. The microcomputer 12 also clears a "time T2 counting flag" to "0" (step S201a). The "time T2 counting flag" indicates that a passing time T2 of a perforation is being counted.

Since the processing in steps S202 to S206 is the same as in FIG. 4, a description thereof will be omitted.

If the PR signal changes from "H" level to "L" level, i.e., the end of a perforation which is located on the film leader side is detected, after a film wind operation is started, the microcomputer 12 checks whether the passing time T2 between perforations is being counted (step S230).

If the time T2 is not being counted, the microcomputer 12 starts a T1 timer to count the passing time T1 of the perforation (step S236), and sets the "time T1 counting flag" to "1" (step S237). The flow then returns to step S204.

If it is determined in step S203 that the passing time T2 between perforations is being counted, the microcomputer 12 stops a T2 timer (step S231), and clears the "time T2 counting flag" to "0" (step S232). The microcomputer 12 then calculates R=T1/(T1+T2) by using the counted passing time T1 of a given perforation (step S233).

In this case, R represents the ratio of the passing time of the first perforation to the passing time between the end of a perforation which is located on the film leader side to the end of the next perforation which is located on the film leader side.

The microcomputer 12 then compares with ratio R with a predetermined value C (step S234).

If R≧C, the microcomputer 12 determines the detected end of the perforation as the position where the film wind operation is to be stopped (step S208), steps the motor 16 (step S208), and terminates the "film wind operation".

If R<C, the flow advances to step S236.

If it is determined in step S204 that the PR signal is at "H" level, i.e., no perforation is positioned on the PR 10 (a film portion is passing through the PR 10), the microcomputer 12 checks whether the "pre-PR state flag" is "0" or "1" (step S211).

If the "pre-PR state flag" is cleared to "0", it indicates that the PR signal has changed from "L" level to "H" level, i.e., the end of a perforation which is located on the cartridge side is detected. The microcomputer 12 therefore sets the "pre-PR state flag" to "1" (step S212) to set the "pre-PR state flag" at the same level as that of the PR signal.

The microcomputer 12 then checks whether the "time T1 counting flag" is "0" or "1", i.e., the passing time T1 of a perforation is being counted (step S238).

If the microcomputer 12 determines that the time T1 is not being counted, the flow returns to step S204. If the time T1 is being counted, the microcomputer 12 stops the timer which has been started in step S236 (step S239).

The microcomputer 12 clears the "time T1 counting flag" to "0" (step S240), and stores a value T1 of the timer in the RAM (step S241).

Subsequently, the microcomputer 12 starts a T2 timer to count the passing time T2 between perforations (step S242), and sets the "time T2 counting flag" to "1" (step S243). The flow then returns to step S204.

FIGS. 15A to 15D are timing charts for explaining the "film wind operation" in FIG. 14.

Note that these timing charts correspond to the FIGS. 5B to 5E described above.

Figure 15A:
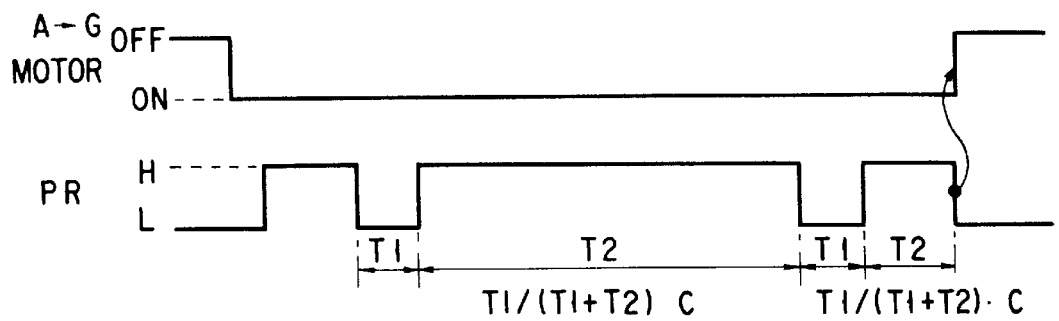
FIGS. 15A to 15D are timing charts for explaining the "film wind" step in FIG. 14.
Figure 15B:
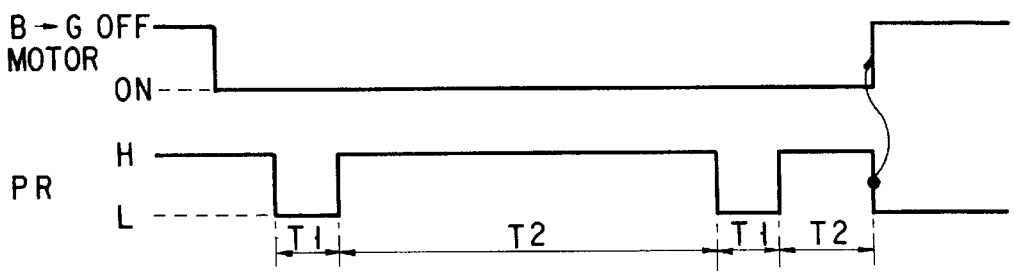

As in the case described with reference to FIGS. 5B and 5C, when a film feed operation is started from a point A or B and stopped at a point G, as shown in FIGS. 15A and 15B, the perforations $P_{nf}$ and $P_{ns}$ are detected before the perforation $P_{(n+1)f}$ at which the film wind operation is to be stopped. However, since the relationship between the passing time T1 of the perforation $P_{nf}$ and the passing time T2 between the perforations $P_{nf}$ and $P_{ns}$ becomes T1/(T1+T2) <C, the film wind operation is not stopped even if the perforation $P_{ns}$ is detected.

In contrast to this, since the relationship between a passing time T1' of the perforation $P_{ns}$ and a passing time T2' between the perforations $P_{ns}$ and $P_{(n+1)f}$ becomes ≦T1'/(T1'+T2'), the film wind operation is stopped when the perforation $P_{(n+1)f}$ is properly detected.

Figure 15C:
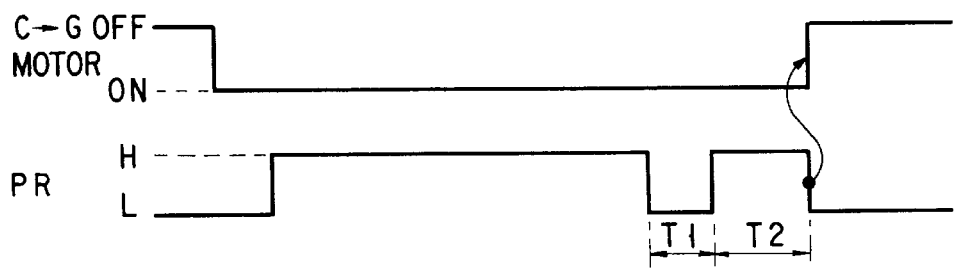
Figure 15D:
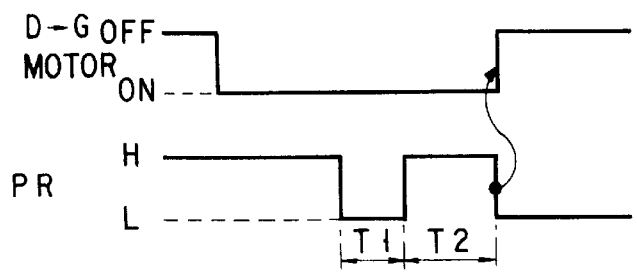

When a film feed operation is started from a point C or D and stopped at a point G, as shown in FIGS. 15C and 15D, since the passing time T1 of the perforation $P_{ns}$ and the passing time T2 between the perforations $P_{ns}$ and $P_{(n+1)f}$ becomes C≦T1/(T1+T2), the film wind operation is stopped when the perforation $P_{(n+1)f}$ is detected.

It suffices if the above constant C is set within the range of Lp/(Lp+Ll)<C<Lp/(Lp+Ls).

The expression "T1/(T1+T2)" is used for the above determination processing, but another expression for determination may be used.

Assume that a film wind operation is continued if C>(T1/T2), and stopped if C≦(T1/T2), the same effect as that described above can be obtained by setting the constant C in the range of (Lp/Ll)<C<(Lp/Ls).

Such a control operation will be described below with reference to the flow chart of FIG. 16.

Figure 16:
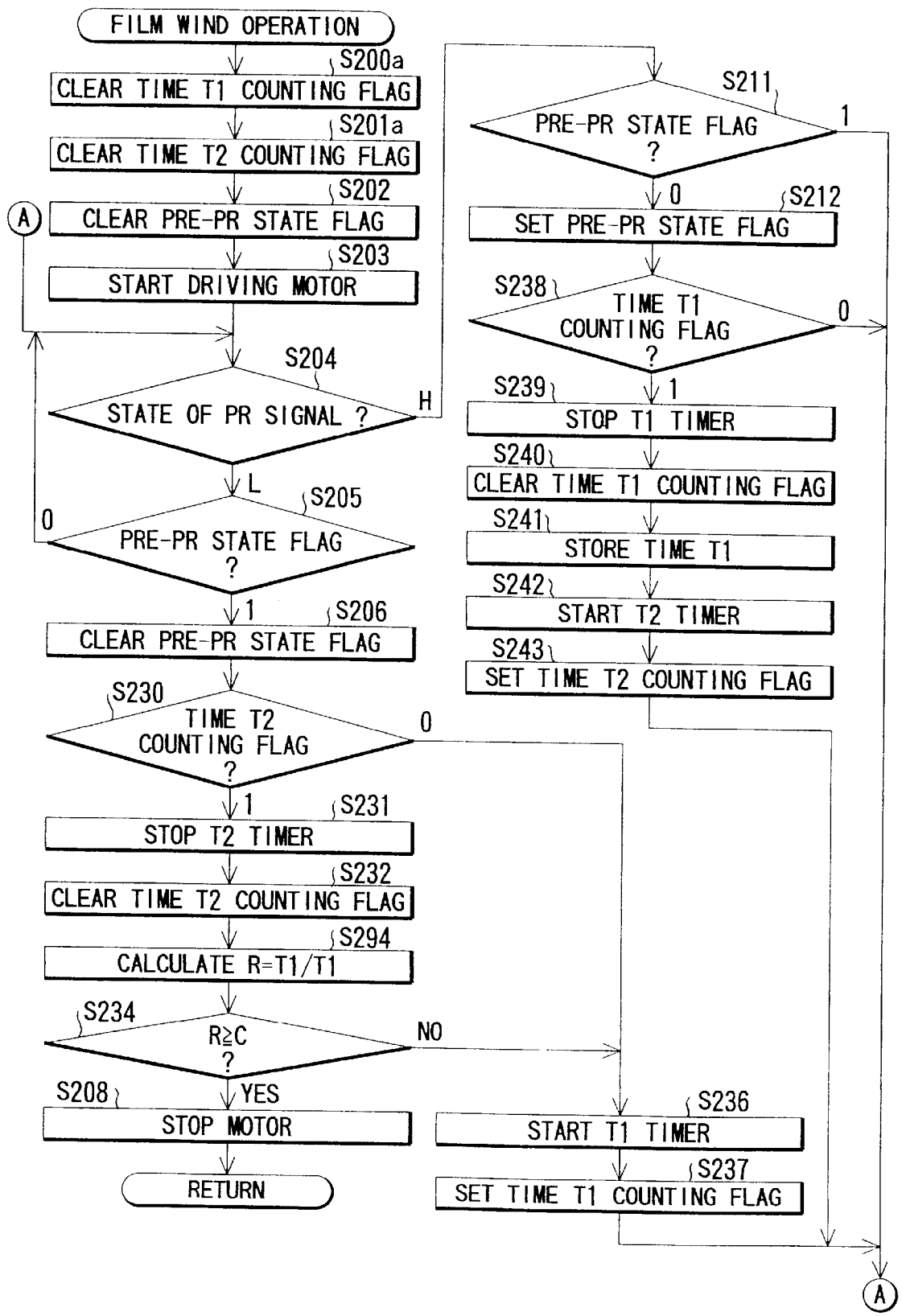
FIG. 16 is a flow chart showing still another modification of the procedure for the "film wind" step in FIG. 4.

The same reference symbols in the flow chart of FIG. 16 denote the same operations as in FIG. 14, and a description thereof will be omitted.

Figure 17A:
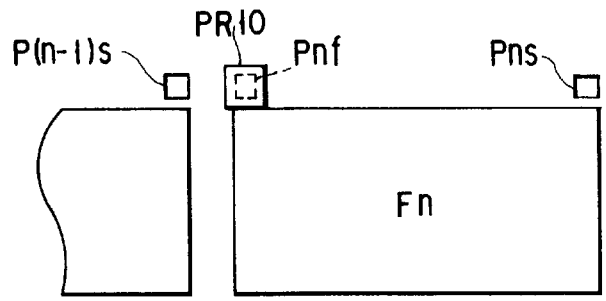
FIGS. 17A to 17C are timing charts for explaining the "film wind" step in FIG. 16.

In this case, as shown in FIG. 17A, the PR 10 is placed to coincide with the position of the perforation $P_{nf}$.

It suffices if R=T1/(T1+T2) in step S233 in the flow chart of FIG. 14 is replaced with R=T1/T2 in step S294 in the flow chart of FIG. 16.

Figure 17B:
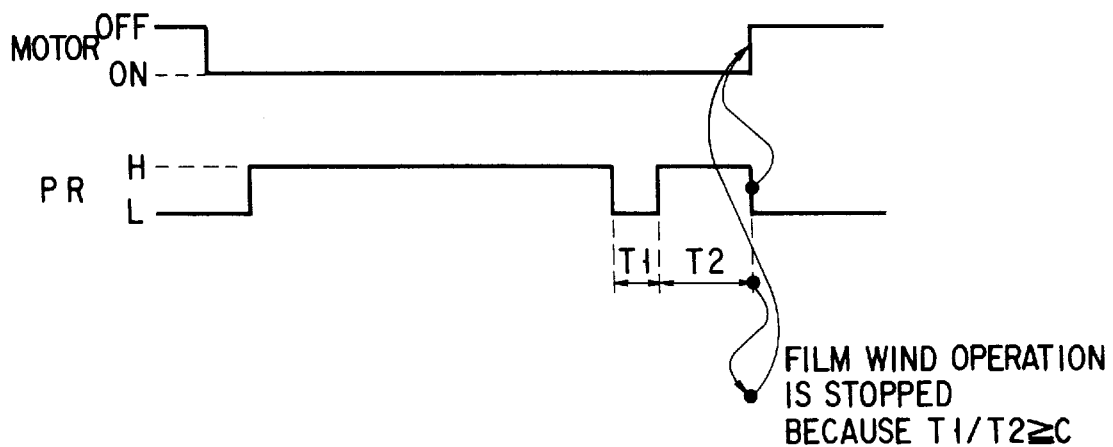
Figure 17C:
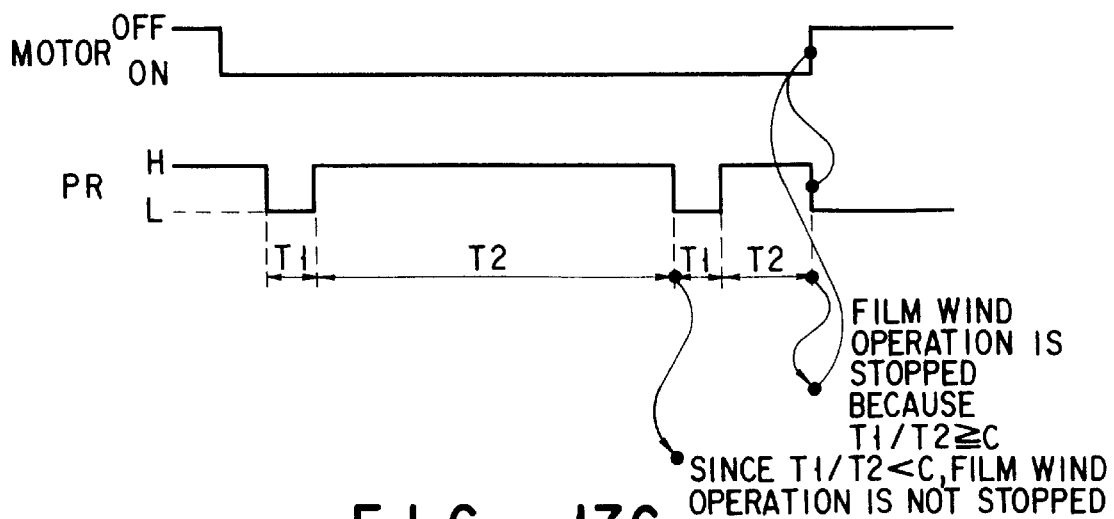

FIGS. 17B and 17C are timing charts for explaining this operation.

FIG. 17B shows a case wherein a film wind operation is started from a correct position. FIG. 17C shows a case wherein a film wind start position deviates from a correct position. In either case, film feed stop control is performed at a correct position, as in the case shown in FIGS. 15A to 15D.

A film feed device according to the second embodiment of the present invention will be described next.

Figure 18:
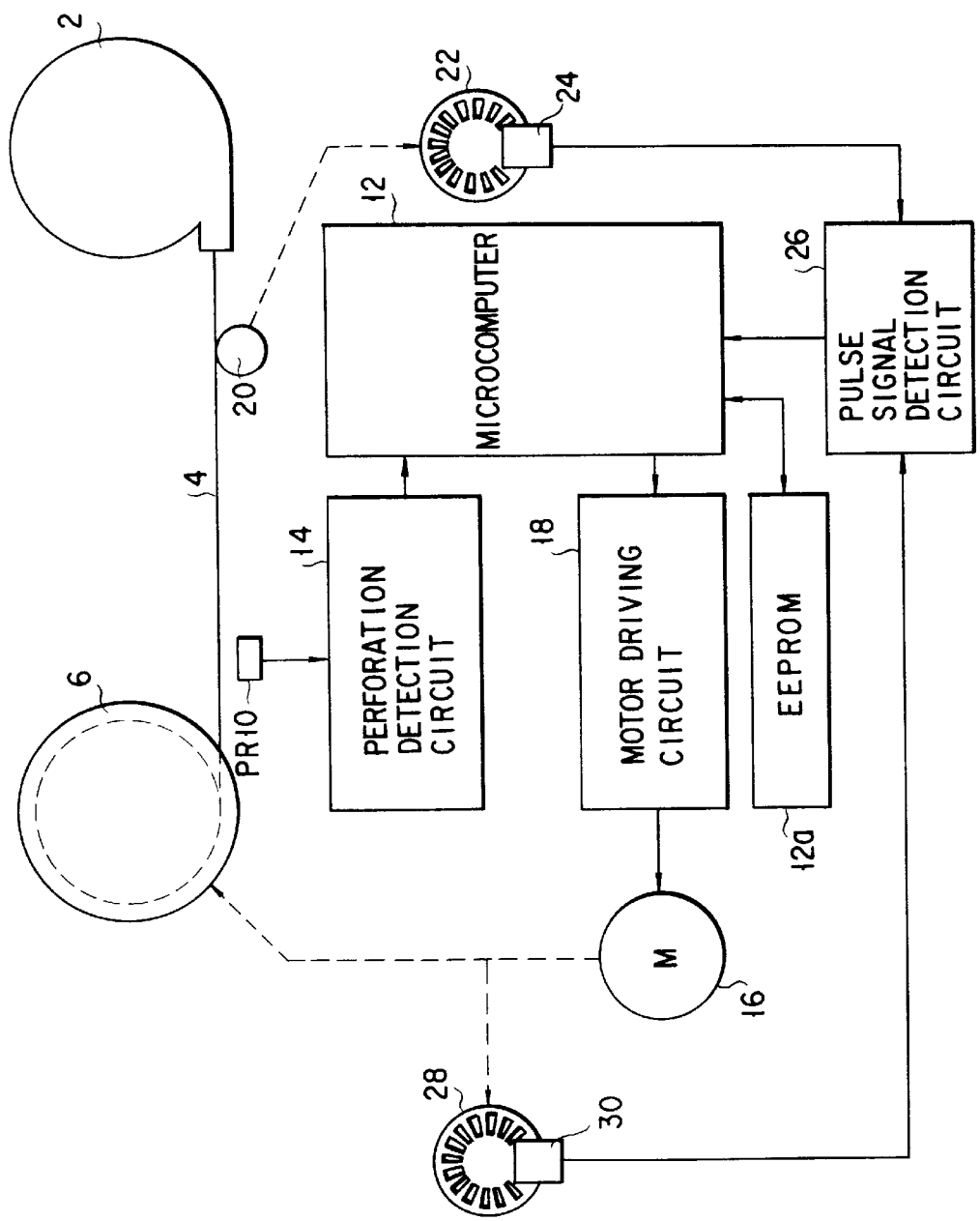
FIG. 18 is a block diagram showing the arrangement of a film feed device according to the second embodiment of the present invention.

FIG. 18 shows the arrangement of the film feed device according to the second embodiment.

This film feed device uses a film driven roller and the like to measure the moving amount of a film more accurately, which is determined by using the timers in the first embodiment.

The same reference numerals in FIG. 18 denote the same parts as in FIG. 1, and a description thereof will be omitted.

Referring to FIG. 18, a driven roller 20 which is pressed against a film 4 and rotated without slipping upon movement of the film 4 is connected to a rotating plate 22 having a plurality of slits through a gear train and the like.

A photointerruptor (to be referred to as a PI hereinafter) 24 for detecting the rotation of the rotating plate 22 is used to convert the rotation amount of the driven roller 20, i.e., the moving amount of the film 4, into a pulse signal. The PI 24 is connected to a microcomputer 12 through a pulse signal detection circuit 26.

A rotating plate 28 coupled to a gear train which couples a motor 16 to a take-up spool 6 has a plurality of slits, like the rotating plate 22.

A PI 30 for detecting the rotation of the rotating plate 28 is used to convert the rotation amount of the take-up spool 6 into a pulse signal. The PI 30 is connected to the microcomputer 12 through the pulse signal detection circuit 26.

With this arrangement, the microcomputer 12 can read the rotation amount of the take-up spool 6, i.e., the moving amount of the film 4, as a corresponding pulse signal.

The operation of the film feed device according to the second embodiment will be described next.

Figure 19:
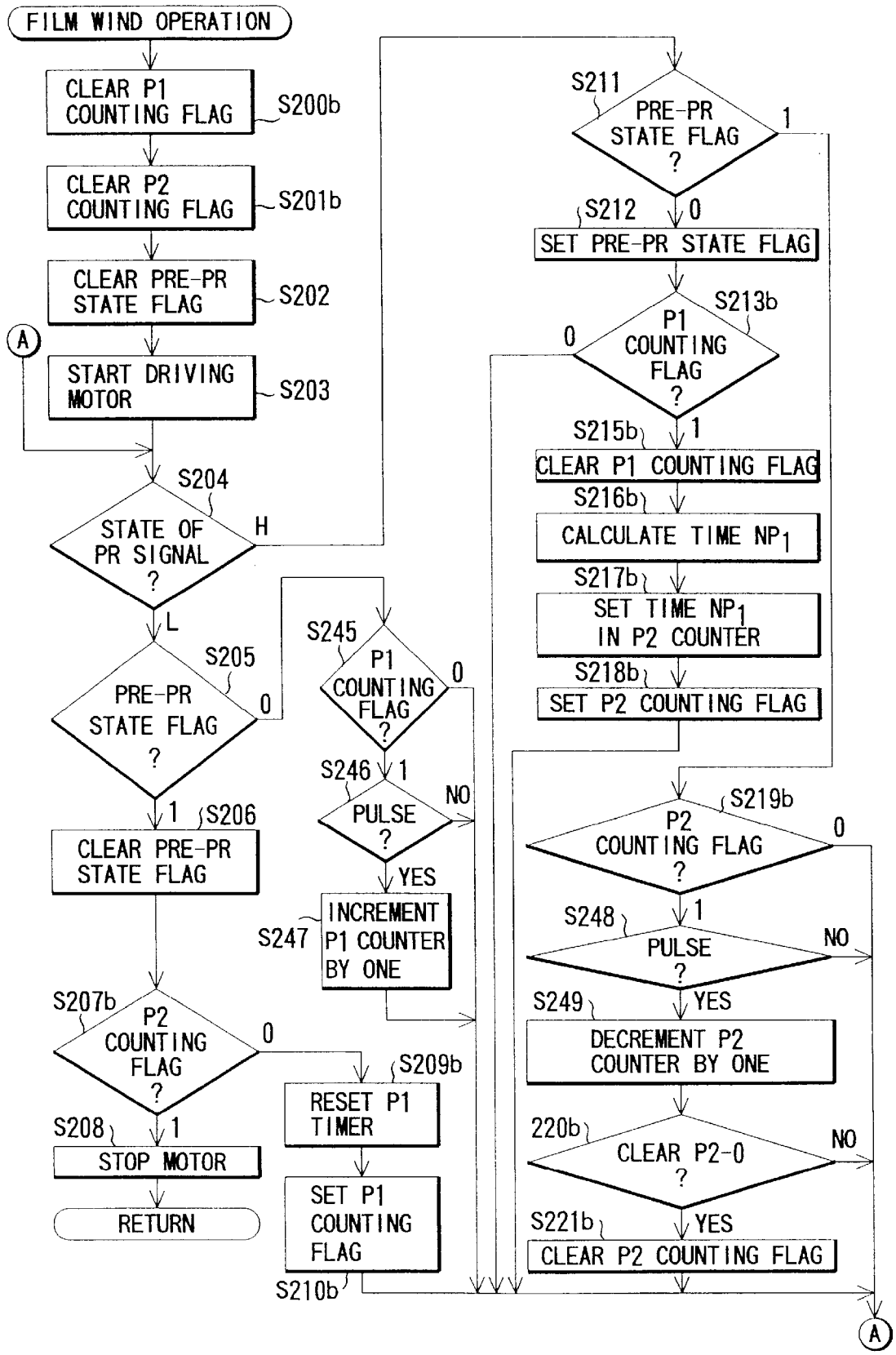
FIG. 19 is a flow chart showing a procedure for the "film wind" step in the film feed device of the second embodiment.

FIG. 19 is a flow chart showing the "film wind operation" of this film feed device. This operation is equivalent to the "film wind operation" in FIG. 4.

The same reference symbols in FIG. 19 denote the same operations as in FIG. 4, and a description thereof will be omitted.

In this case, either a signal from the PI 24 or a signal from the PI 30 can be used as a pulse signal corresponding to the moving amount of the film 4, and hence these signals will not be discriminated and handled as pulse signals.

First of all, the microcomputer 12 clears a "P1 counting flag" to "0" (step S200b). The "P1 counting flag" indicates that the number (P1) of pulses is being counted during the passage of a perforation. The microcomputer 12 also clears a "P2 counting flag" to "0" (step S201b). The "P2 counting flag" indicates that the number of pulses N times the number P1 of pulses is being counted.

When the PR signal changes from "H" level to "L" level, i.e., an end of a perforation which is located on the film leader side is detected, after a film wind operation is started, the microcomputer 12 checks whether the "P2 counting flag" is "0" or "1" (step S207b).

If the "P2 counting flag" is set to "1", the microcomputer 12 can determine that the detected perforation is a perforation at which the film wind operation is to be stopped. The microcomputer 12 therefore stops a motor 16 (step S208) to complete the "film wind operation".

If the "P2 counting flag" is cleared to "0", since the detected perforation is not a perforation at which the film wind operation is to be stopped, the microcomputer 12 resets a P1 counter for counting pulses during the passage of a perforation, thereby counting the number P1 of pulses during the passage of the perforation (step S209b). The microcomputer 12 then sets the "P1 counting flag" to "1" (step S210b). The flow returns to step S204.

If it is determined in steps S204 and S205 that the PR signal is in an "L" level interval, it indicates that a perforation is passing through the PR 10. The microcomputer 12 therefore checks whether the "P1 counting flag" is "0" or "1" (step S245).

If the "P1 counting flag" is set to "1", the microcomputer 12 determines that the number of pulses is being counted, and further checks the presence/absence of a pulse signal (step S246).

If it is determined that a pulse signal is generated, the microcomputer 12 increments the P1 counter by one (step S247). The flow then returns to step S204.

If it is determined that no pulse signal is generated, the flow directly returns to step S204.

If it is determined in step S245 that the "P1 counting flag" is cleared to "0", the microcomputer 12 determines that the number P1 of pulses is not being counted. The flow then directly returns to step S204.

In this manner, pulses generated during the passage of a perforation are counted by the P1 counter.

If it is determined in steps S204 and S211 that the PR signal has changed from "L" level to "H" level, i.e., the end of a perforation which is located on the cartridge side is detected, the microcomputer 12 checks whether the "P1 counting flag" is "0" or "1" (step S213b).

If the microcomputer 12 determines that the "P1 counting flag" is cleared to "0", the flow returns to step S204.

If the "P1 counting flag" is set to "1", since it is determined that a perforation has passed through the PR 10, the microcomputer 12 clears the "P1 counting flag" to "0" (step S215b). The microcomputer 12 multiplies the number P1 of pulses counted during the passage of the perforation by N (step S216b), and presets the resultant value in a P2 counter as a decrement counter (step S217b).

After the microcomputer 12 sets the "P2 counting flag" to "1" (step S218b), the flow returns to step S204.

If it is determined in steps S204 and S211 that the PR signal is set in the "H" level interval, it indicates that no perforation is placed above the PR 10 (a film portion is passing through the PR 10). The microcomputer 12 checks whether the "P2 counting flag" is "0" or "1" (step S219b).

If the "P2 counting flag" is cleared to "0", the microcomputer 12 determines that a counting operation is not being performed. The flow then returns to step S204.

If the "P2 counting flag" is set to "1", the microcomputer 12 determines that a counting operation is being performed, and further checks the presence/absence of a pulse signal (step S248).

If it is determined that a pulse signal is generated, the microcomputer 12 decrements the value of the P2 counter by one (step S249). After the count value is decremented, the microcomputer 12 checks whether the value of the P2 counter becomes "0" (step S220b).

When the value of the P2 counter becomes "0", the microcomputer 12 clears the "P2 counting flag" to "0" (step S221b). The flow then returns to step S204.

If the microcomputer 12 determines that the value of the P2 counter is not "0", the flow directly returns to step S204.

If the microcomputer 12 determines in step S248 that no pulse signal is generated, and determines in step S219b that the "P2 counting flag" is cleared to "0", the flow directly returns to step S204.

That is, this film feed device stops a film wind operation if the next perforation is detected while the film is moving by a distance N times the moving amount of the film which is gained when the perforation passes through the PR 10, and continues the film wind operation if no perforation is detected.

Figure 20A:
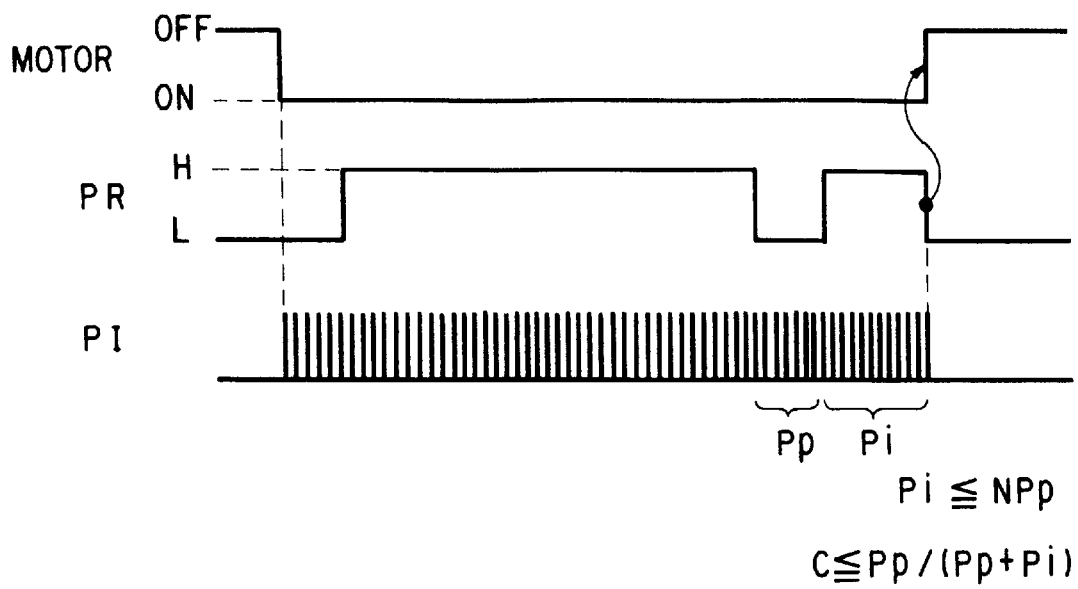
FIGS. 20A and 20B are timing charts for explaining the "film wind" step in FIG. 19.
Figure 20B:
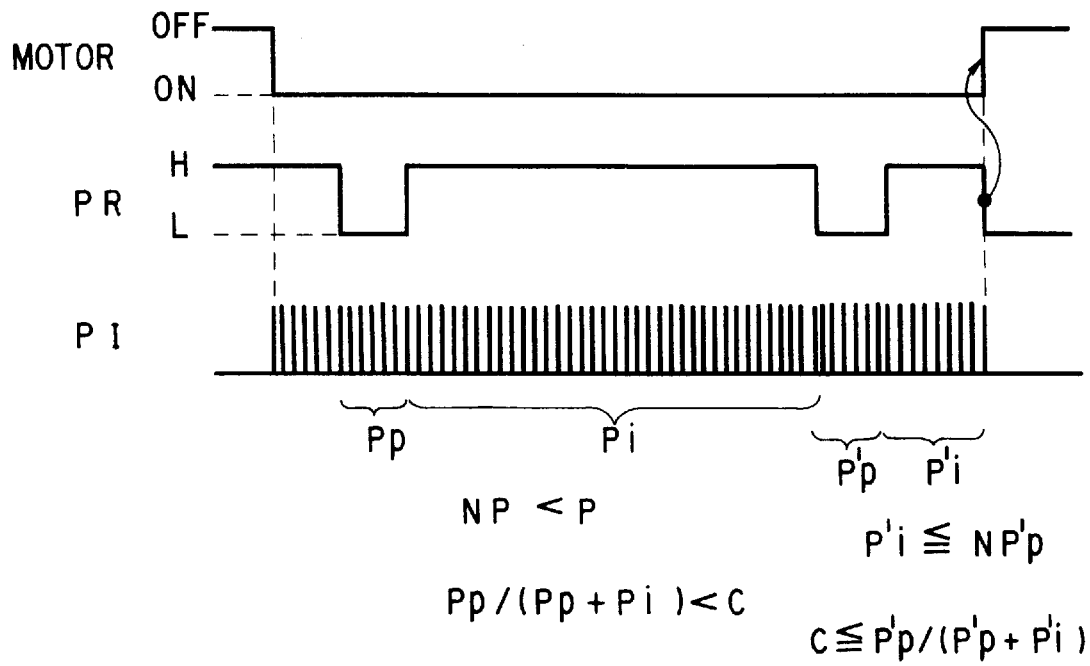

FIGS. 20A and 20B are timing charts for explaining the "film wind operation" step in FIG. 19.

This film feed device stops a film wind operation if $Pi \leq NP_p$, where $P_p$ is the number of pulses generated during the passage of a perforation, and Pi is the number of pulses generated during the passage of a perforation interval, and continues a film wind operation if $NP_p < Pi$.

In the case shown in FIG. 20A, a film wind operation is stopped at the second perforation. In the case shown in FIG. 20B, a film wind operation is stopped at the third perforation.

In this case, the constant N may be set near the midpoint of the range of $Ls/Lp < N < Ll/Lp$ using Lp, Ls, and Ll described above.

As described in the first embodiment, even if the position of the PR 10 is changed, the same control as described above can be performed by changing the determination method.

Still another modification of the "film wind operation" step in FIG. 19 will be described next with reference to the flow chart of FIG. 21.

Figure 21:
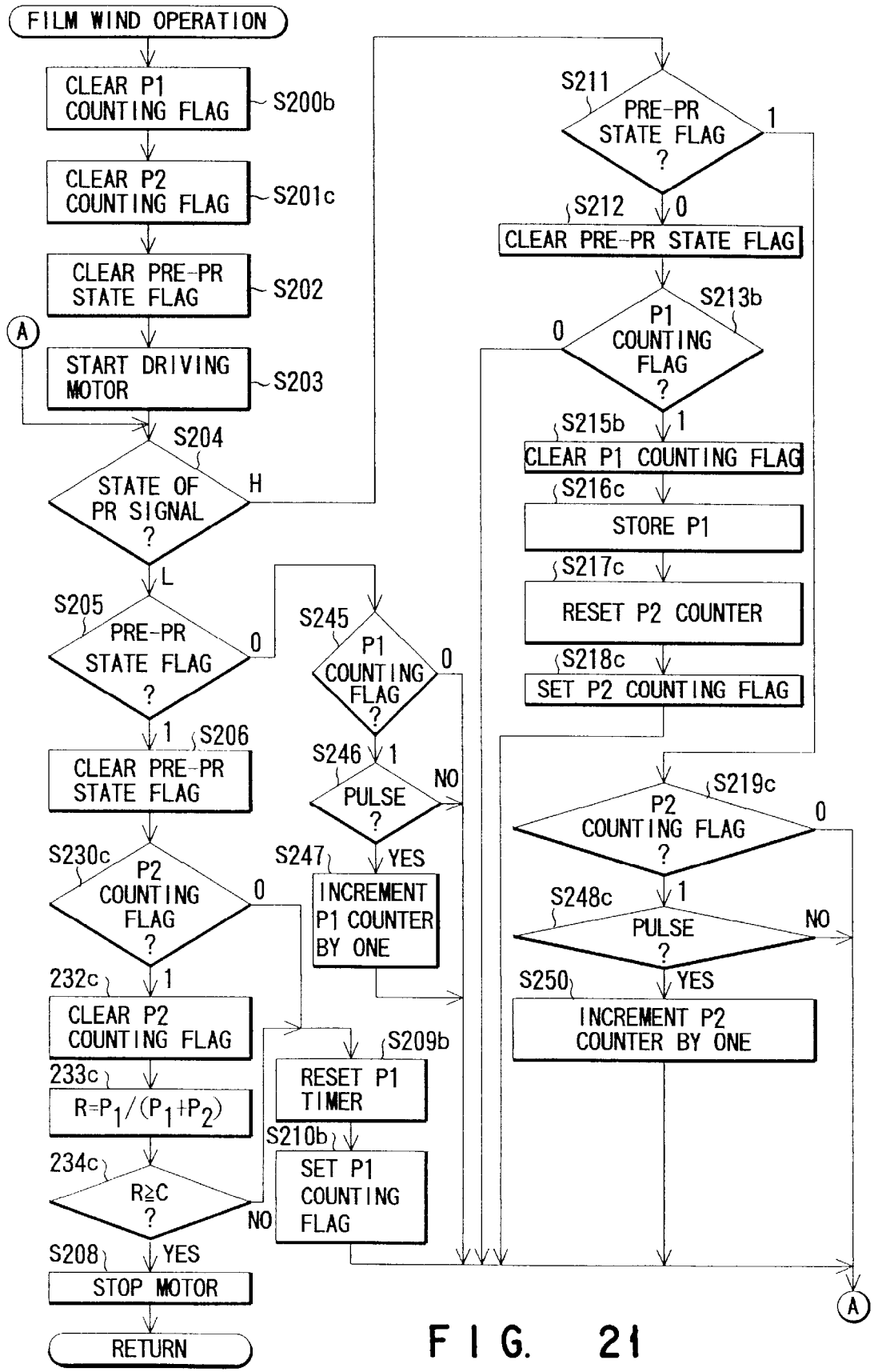
FIG. 21 is a flow chart showing a modification of the procedure for the "film wind" step in FIG. 19.

The same reference symbols in the flow chart of FIG. 21 denote the same operations as in the flow chart of FIG. 9 or operations corresponding thereto, and a description thereof will be omitted.

The microcomputer 12 clears a "P1 counting flag" to "0" (step S200b). The "P1 counting flag" indicates that the number (P1) of pulses is being counted during the passage of a perforation. The microcomputer 12 also clears a "P2 counting flag" to "0" (step S201c). The "P2 counting flag" indicates that the number (P2) of pulses is being counted during the passage of a perforation interval. The microcomputer 12 clears a "pre-PR state flag" to "0" (step S202).

If the PR signal changes from "H" level to "L" level, i.e., an end of a perforation which is located on the film leader side is detected, after a film wind operation is started (step S203), the microcomputer 12 checks the "P2 counting flag" to "0" or "1" (step S230c).

If the "P2 counting flag" is cleared to "0", since the detected perforation is not a perforation at which the film wind operation is to be stopped, the microcomputer 12 resets the P1 counter for counting pulses during the passage of a perforation to count the number P1 of pulses generated during the passage of a perforation (step S209b). The microcomputer 12 also sets the "P1 counting flag" to "1" (step S210b). Thereafter, the flow returns to step S204.

If it is determined in step S230c that the "P2 counting flag" is set to "1", the microcomputer 12 determines that the number P2 of pulses has been completely counted. The microcomputer 12 then clears the "P2 counting flag" to "0" (step S232c), and calculates R=P1/(P1+P2) by using the counted number P1 of pulses generated during the passage of the perforation, and the counted number P2 of pulses generated during the passage of the perforation interval (step S233c).

Subsequently, the microcomputer 12 checks whether the relationship between the obtained value R and the constant C satisfies R≧C (step S234c). If R≧C is satisfied, the motor 16 is stopped (step S208) to finish the "film wind operation".

If the microcomputer 12 determines that R<C, the flow advances to step S209b to start counting the number P1 of pulses during the passage of a perforation again.

If it is determined in steps S204 and S211 that the PR signal changes from "L" level to "H" level, since it indicates that the end of a perforation which is located on the cartridge side is detected, the microcomputer 12 checks whether the "P1 counting flag" is set to "0" or "1" (step S213b).

If the microcomputer 12 determines that the "P1 counting flag" is cleared to "0", the flow returns to step S204.

If the "P1 counting flag" is set to "1", since it can be determined that a perforation has completely passed, the microcomputer 12 clears the "P1 counting flag" to "0" (step S215b), and stores the number P1 of pulses counted during the passage of the perforation in the RAM to perform the calculation in step S233c (step S216c).

The microcomputer 12 resets the P2 counter to start counting the number P2 of pulses during the passage of a perforation interval (step S217c). The microcomputer 12 also sets the "P2 counting flag" to "1" (step S218c). The flow returns to step S204.

If it is determined in steps S204 and S205 that the PR signal is set in an "L" level interval, since it indicates that a perforation is passing through the PR 10, the microcomputer 12 continues to count the number P1 of pulses (steps S245 to S247).

If it is determined in steps S204 and S211 that the PR signal is set in an "H" level interval, it indicates that no perforation is located above the PR 10 (a film portion is passing through the PR 10), the microcomputer 12 checks whether the "P2 counting flag" is set to "0" or "1" (step S219c).

If the "P2 counting flag" is cleared to "0", the microcomputer 12 determines that a counting operation is not performed. The flow then returns to step S204.

If the "P2 counting flag" is set to "1", the microcomputer 12 determines that a counting operation is being performed, and further checks the presence/absence of a pulse signal (step S248c).

If it is determined that a pulse signal is generated, the microcomputer 12 increments the P2 counter by one (step S250). The flow then returns to step S204.

If the microcomputer 12 determines in step S248c that no pulse signal is generated, the flow returns to step S204.

The constant C in step S234c can be set according to Lp/(Lp+Ll)<C<Lp/(Lp+Ls) using Lp, Ls, and Ll described above.

The operation result in the flow chart of FIG. 21 is indicated by the timing charts of FIGS. 20A and 20B, as in the case shown in FIG. 19.

As described in the first embodiment, the constant C may be set within the range of (Lp/Ll)<C<(Lp/Ls), and control may be performed such that a film wind operation is continued if (P1/P2)<C, and is stopped if C≦(P1/P2).

Such a control operation will be described below with reference to the flow chart of FIG. 22.

Figure 22:
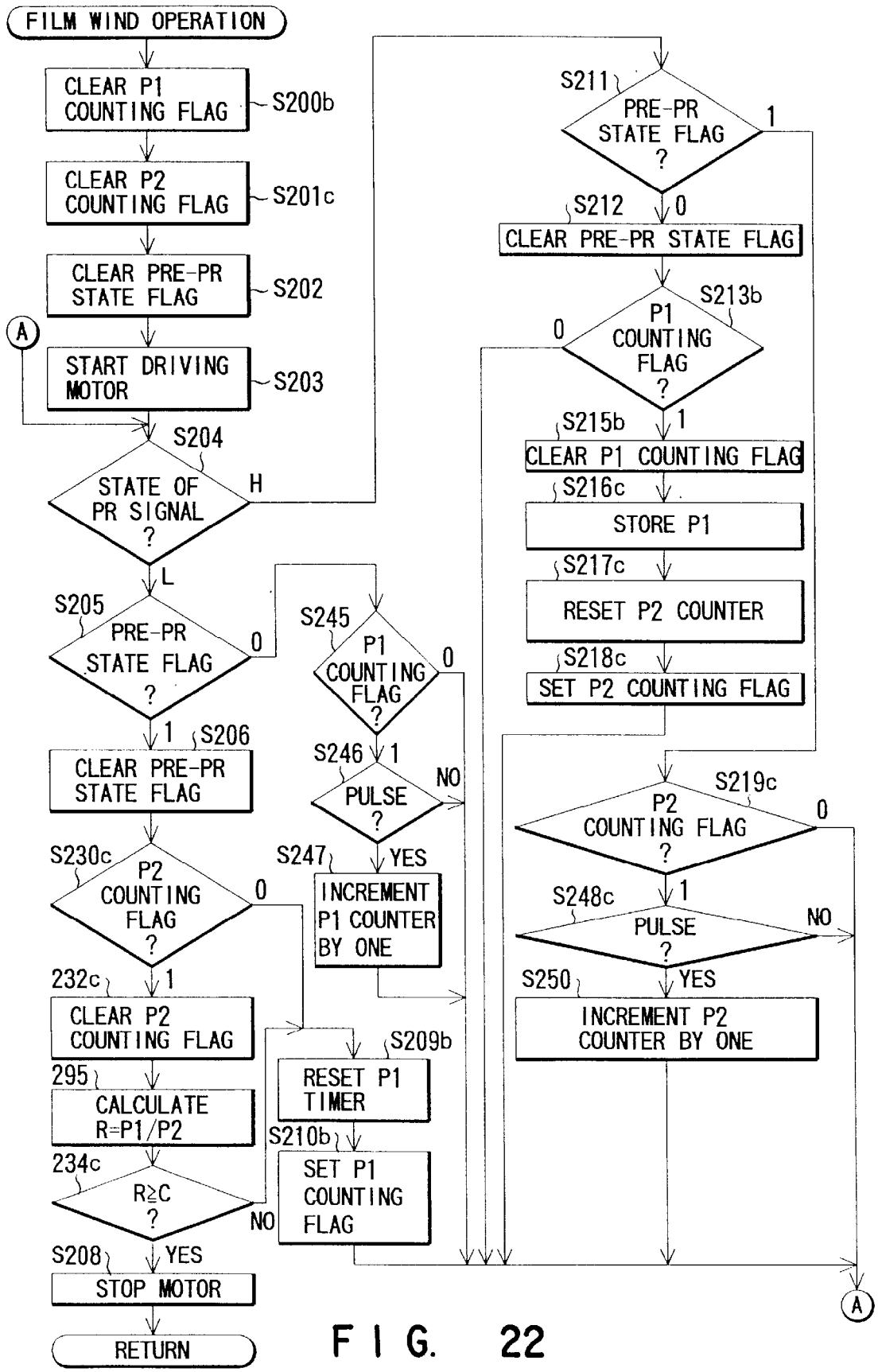
FIG. 22 is a flow chart showing another modification of the procedure for the "film wind" step in FIG. 19.

The same reference symbols in the flow chart of FIG. 22 denote the same operations as in the flow chart of FIG. 21, and a description thereof will be omitted.

In this case, as shown in FIG. 23A, the PR 10 is placed to coincide with the position of a perforation $P_{nf}$.

It suffices if R=P1/(P1+P2) in step S233c in the flow chart of FIG. 21 is replaced with R=P1/P2 in step S295 in the flow chart of FIG. 22.

FIGS. 23B and 23C are timing charts for explaining this operation.

FIG. 23B shows a case wherein a film wind operation is started from a correct position. FIG. 23C shows a case wherein a film wind start position deviates from a correct position. In either case, film feed stop control is performed at a correct position as in the case shown in FIGS. 20A and 20B.

In the first and second embodiments, even if the positions of the PR 10 and the exposure aperture 8 are shifted from each other, the same effects as those described above can be obtained by changing the procedures and the expressions for determination which are used to measure the passing time/moving amount of perforation and the passing time/moving amount of a perforation interval.

As described above, according to the second embodiment, since the moving amount of a film is directly detected with a pulse signal, even if the film feed speed varies, a highly reliable film wind operation can be realized.

In addition, two systems of pulse generating means, each constituted by a driven roller, a rotating plate, a photointerruptor, a pulse signal detection circuit, and the like, as in the arrangement shown in FIG. 18, need not be used. It suffices to use one of the systems.

Furthermore, any special pulse generating means need not be used for film feed control. If, for example, a motor is used to drive both a date imprinting film moving amount encoder and another mechanism, a motor rotational speed encoder or the like may be used.

This arrangement does not hinder the miniaturization of the device.

According to this embodiment, a film feed device can be provided, which can accurately perform a film feed operation by using one perforation sensor even if a film feed operation is started from a position deviating from a correct position.

Note that the film feed device of the present invention can be applied to an image reader such as a film scanner as well as a camera.

As has been described above, according to the present invention, there is provided a film feed device which can accurately align a film by using one perforation sensor, even if the film position deviates from a predetermined position at the start of a film feed operation, by measuring a perforation width and a perforation interval as times during the film feed operation.

In addition, according to the present invention, there is provided a film feed device which can align a film by using one perforation sensor more accurately than with the control based on the above times, even if the film position deviates from a predetermined position at the start of a film feed operation, by measuring a perforation width and a perforation interval as film moving amounts using a film moving amount detection means.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

We claim:

1. A film feed device using a film having a plurality of perforations which are sequentially aligned so that two perforations are positioned in each frame of the film, each perforation including a front edge portion and a rear edge portion, said film feed device comprising:

means for feeding the film;

means for detecting each of the front edge portion and rear edge portion of each of the sequentially aligned perforations while the film is fed;

means for measuring an interval between detection of one of the front and rear edge portions of a given one of the sequentially aligned perforations and detection of a next one of the front and rear edge portions of the sequentially aligned perforations;

means for multiplying the measured interval by a predetermined number to determine a reference time period; and means for stopping said film from being fed when a still next one of the front and rear edge portions of the sequentially aligned perforations is detected within the reference time period.

2. A film feed device comprising:

means for feeding a film having a plurality of perforations which are sequentially aligned so that two perforations are positioned in each frame of the film, each perforation including a front edge portion and a rear edge portion;

means for detecting a feed amount of the film while the film is fed;

means for detecting each of the front edge portion and rear edge portion of each of the sequentially aligned perforations while the film is fed;

means for measuring an interval between detection of one of the front and rear edge portions of a given one of the sequentially aligned perforations and detection of a next one of the front and rear edge portions of the sequentially aligned perforations;

means for multiplying the measured interval by a predetermined number to determine a reference time period; and means for stopping said film from being fed when a still next one of the front and rear edge portions of the sequentially aligned perforations is detected within the reference time period.

3. A film feed device comprising:

means for feeding a film having a plurality of perforations which are sequentially aligned so that two perforations are positioned in each frame of the film, each perforation including a front edge portion and a rear edge portion;

means for generating signals in accordance with passage of the front and rear edge portions of each of the sequentially aligned perforations while the film is fed;

means for measuring an interval between the generated signals in relation to adjacent ones of the front and rear edge portions of the sequentially aligned perforations;

means for multiplying the measured interval by a predetermined number to determine a reference time period; and means for stopping said film from being fed when a next one of the front and rear edge portions of the sequentially aligned perforation is detected within the reference time period.

4. A film feed device comprising:

means for feeding a film having a plurality of perforations which are sequentially aligned so that two perforations are positioned in each frame of the film, each perforation including a front edge portion and a rear edge portion;

means for detecting the front edge portion and the rear edge portion of each of the sequentially aligned perforations while the film is fed;

means for measuring an interval between detection of one of the front and rear edge portions of a given one of the sequentially aligned perforations and detection of a next one of the front and rear edge portions of the sequentially aligned perforations;

means for multiplying the measured interval by a predetermined number to determine a reference time period; and means for stopping said film from being fed when a still next one of the front and rear edge portions of the sequentially aligned perforations is detected within the reference time period.

5. A film feed device for feeding a film having a plurality of perforations which are sequentially aligned so that two perforations are positioned in each exposure area of the film, said film feed device comprising:

means for at least one of winding and rewinding the film;

means for outputting a signal each time an end portion of one of the sequentially aligned perforations is detected during a winding and rewinding operation;

means for measuring an interval between a plurality of the output signals;

means for multiplying the measured interval by a predetermined number to determine a reference time period;

means for determining a stop position of the film based on a detection of a next end portion of the sequentially aligned perforation during the reference time period; and means for controlling said driving of said film so that said film is stopped at the stop position.

6. A device according to claim 5, further comprising a nonvolatile memory in which film wind control information for determining whether a film wind operation is being performed can be written and erased, and wherein the film is fed while the film wind control information written in said nonvolatile memory indicates that the film wind operation is being performed.

7. A device according to claim 6, further comprising means for performing a restoring operation based on the film wind control information written in said nonvolatile memory when a power supply is turned off during the film wind operation.

8. A device according to claim 5, wherein said means for measuring the interval between the plurality of the output signals comprises means for starting a time counting operation each time the end portion of one of the sequentially aligned perforations is detected during a winding and rewinding operation.

9. A device according to claim 5, wherein said means for measuring the interval between the plurality of the output signals comprises means for starting to detect a moving amount of the film each time the end Portion of one of the sequentially aligned perforations is detected during a winding and rewinding operation.

10. A device according to claim 9, wherein said means for starting to detect the movement amount of the film comprises means for measuring a rotation amount of a rotating member in contact with the film.

11. A device according to claim 9, wherein said means for starting to detect the movement amount of the film comprises means for measuring a rotation amount of a motor for rotating a take-up spool for the film.

12. A device according to claim 5, wherein each of the sequentially aligned perforations includes two end portions.

13. A film feed device using a film having a plurality of perforations which are sequentially aligned so that two perforations are positioned in each frame of the film, said film feed device comprising:

means for feeding the film;

means for outputting a signal in accordance with detection of an end portion of each of the sequentially aligned perforations;

means for measuring an interval between a plurality of the output signals while the film is fed;

means for multiplying the measured interval by a predetermined value to thereby calculate a movement amount; and means for, after the end portion of a given one of the sequentially aligned perforations is detected, stopping the film from being fed when a next end portion is detected before the film is moved by the calculated movement amount.

14. A device according to claim 13, wherein each of the sequentially aligned perforations includes two end portions.

* * * * *

UNITED STATES PATENT AND TRADEMARK OFFICE
CERTIFICATE OF CORRECTION

PATENT NO. : 5,915,137

DATED : June 22, 1999

INVENTOR(S) : Satoshi Miyazaki

It is certified that error appears in the above-identified patent and that said Letters Patent is hereby corrected as shown below:

Column 11, line 20, change "S724" to --S274--.

Signed and Sealed this

Second Day of November, 1999

Attest:

Attesting Officer

Q. TODD DICKINSON

Acting Commissioner of Patents and Trademarks